United States Patent
Cox et al.

(10) Patent No.: US 11,140,422 B2
(45) Date of Patent: Oct. 5, 2021

(54) THIN-CLOUD SYSTEM FOR LIVE STREAMING CONTENT

(71) Applicant: Microsoft Technology Licensing, LLC, Redmond, WA (US)

(72) Inventors: Landon Prentice Cox, Seattle, WA (US); Paramvir Bahl, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/583,078

(22) Filed: Sep. 25, 2019

(65) Prior Publication Data
US 2021/0092462 A1   Mar. 25, 2021

(51) Int. Cl.
*G06N 3/04*       (2006.01)
*H04N 21/2343*    (2011.01)
(Continued)

(52) U.S. Cl.
CPC ........... *H04N 21/2187* (2013.01); *G06N 3/04* (2013.01); *H04N 21/231* (2013.01);
(Continued)

(58) Field of Classification Search
CPC ............. H04N 21/231; H04N 21/2187; H04N 21/234363; H04N 21/251; H04N 21/26258; H04N 21/2662; H04N 21/23418; H04N 21/222; H04N 21/23439; H04N 21/4621; H04N 21/4781; H04N 21/44029;
(Continued)

(56) References Cited

U.S. PATENT DOCUMENTS 10,701,394 B1 *  6/2020  Caballero ............... G06N 3/08
10,819,993 B2 * 10/2020  Park ....................... H04N 19/30
(Continued)

FOREIGN PATENT DOCUMENTS

CN      106791927 A  *  5/2017
CN      107133919 A  *  9/2017
(Continued)

OTHER PUBLICATIONS

"International Search Report and Written Opinion Issued in PCT Application No. PCT/US20/038281", dated Aug. 18, 2020, 11 Pages.
(Continued)

*Primary Examiner* — Robert J Hance

(57) ABSTRACT

A thin-cloud system for distributing content, for example, live streaming video content, from a broadcaster to a viewer is provided herein. The computing devices of the broadcaster can provide the multi-bitrate transcoding, of the two or more bitstreams, sent to a file server, which alleviates the need for the file server to encode the streams for a viewer. These multiple streams are received by a file server for provision to one or more viewers. The viewers can receive the streams at one of the two or more bitrates. If the viewer receives the content at a lower bitrate, the viewers can employ a machine learning (ML) co-processor that can operate as an accelerator to improve the inbound content, if that content is provided at a lower bitrate, and thus, a lower resolution. The file server can train and provide the ML models used for the acceleration.

20 Claims, 16 Drawing Sheets

(51) Int. Cl.
H04N 21/2187 (2011.01)
H04N 21/231 (2011.01)
H04N 21/25 (2011.01)
H04N 21/262 (2011.01)
H04N 21/2662 (2011.01)
H04N 21/442 (2011.01)

(52) U.S. Cl.
CPC ... *H04N 21/234363* (2013.01); *H04N 21/251* (2013.01); *H04N 21/2662* (2013.01); *H04N 21/26258* (2013.01); *H04N 21/44209* (2013.01)

(58) Field of Classification Search
CPC ....... H04N 21/44008; H04N 21/42607; H04N 21/41407; G06N 3/04
See application file for complete search history.

(56) References Cited

U.S. PATENT DOCUMENTS

| | | | |
|---|---|---|---|
| 10,950,009 B2* | 3/2021 | Dinh | G06N 3/084 |
| 2017/0339431 A1 | 11/2017 | Zhang et al. | |
| 2018/0139458 A1 | 5/2018 | Wang et al. | |
| 2018/0167699 A1* | 6/2018 | Ginzberg | H04L 67/2823 |
| 2018/0316949 A1* | 11/2018 | Banerjee | H04N 19/40 |
| 2019/0045168 A1* | 2/2019 | Chaudhuri | G06T 1/20 |
| 2019/0287217 A1 | 9/2019 | Cooke et al. | |
| 2020/0186809 A1* | 6/2020 | Mukherjee | H04N 19/147 |
| 2020/0382826 A1* | 12/2020 | Liu | H04L 65/602 |

FOREIGN PATENT DOCUMENTS

| | | | | |
|---|---|---|---|---|
| CN | 109525859 A * | 3/2019 | | |
| KR | 20000058527 A * | 10/2000 | | |
| WO | WO-2017055609 A1 * | 4/2017 | | G06T 9/001 |
| WO | WO-2019104705 A1 * | 6/2019 | | G06T 3/4053 |

OTHER PUBLICATIONS

"Alliance for Open Media", Retrieved From: https://web.archive.org/web/20180101234510/https://aomedia.org/, Jan. 1, 2018, 4 Pages.

"Amazon Elastic Transcoder Pricing", Retrieved From: aws.amazon.com/elastictranscoder/pricing/, Dec. 2018, 5 Pages.

"Media Services Pricing", Retrieved From: https://azure.microsoft.com/en-us/pricing/details/media-services/, Dec. 2018, 12 Pages.

"Pay As You Go Pricing Plans", Retrieved Frrom: https://www.wowza.com/pricing/streaming-cloud-plans/service-provider, Dec. 2018, 6 Pages.

Ao, et al., "Sprocket: A serverless Video Processing Framework", In Proceedings of the ACM Symposium on Cloud Computing, Oct. 11, 2018, pp. 263-274.

Cuervo, et al., "Kahawai: High-Quality Mobile Gaming Using Gpu Offload", In Proceedings of the 13th Annual International Conference on Mobile Systems, Applications, and Services, May 19, 2015, pp. 121-135.

Dong, et al., "Image Deblurring and Super-Resolution by Adaptive Sparse Domain Selection and Adaptive Regularization", In the Journal of IEEE Transactions on Image Processing, vol. 20, Issue 7, Jan. 28, 2011, 35 Pages.

Dong, et al., "Image Super-Resolution Using Deep Convolutional Networks", In the Journal of IEEE transactions on Pattern Analysis and Machine Intelligence, vol. 38, Issue 2, Jun. 1, 2015, 14 Pages.

Elliott, Rhys, "Performance of Samsung and Apple Flagship Smartphones: 43.5 Million Active iPhone X Devices in May 2018", Retrieved DatE: https://newzoo.com/insights/articles/performance-of-samsung-and-apple-flagship-smartphones/, Jul. 30, 2018, 7 Pages.

Fouladi, et al., "Encoding, Fast and Slow: Low-Latency Video Processing Using Thousands of Tiny Threads". In the Proceedings of the 14th USENIX Symposium on Networked Systems Design and Implementation, Mar. 27, 2017, pp. 363-376.

Fouladi, et al., "Salsify: Low-Latency Network Video through Tighter Integration Between a Video Codec and a Transport Protocol", In Proceedings of 15th USENIX Symposium on Networked Systems Design and Implementation, Apr. 9, 2016, pp. 267-282.

Glasner, et al., "Super-resolution from a single image", In Proceedings of IEEE 12th International Conference on Computer Vision, Sep. 29, 2009, 8 Pages.

Kim, et al., "Accurate Image Super-Resolution Using Very Deep Convolutional Networks", In Proceedings of the IEEE conference on Computer Vision and Pattern Recognition, Nov. 11, 2016, 9 Pages.

Li, et al., "Image Quality Assessment by Separately Evaluating Detail Losses and Additive Impairments", In Journal of IEEE Transactions on Multimedia, vol. 13, Issue 5, Oct. 2011, pp. 935-949.

Li, et al., "Toward a Practical Perceptual Video Quality Metric.", In the Journal of the Netflix Tech Slog, vol. 6, Jun. 5, 2016, 21 Pages.

Lim, et al., "Enhanced Deep Residual Networks for Single Image Super-Resolution", In Proceedings of the IEEE Conference on Computer Vision and Pattern Recognition Workshops, Jul. 21, 2017, 9 Pages.

Mao, et al., "Neural Adaptive Video Streaming with Pensieve", In Proceedings of Conference of ACM Special Interest Group on Data Communication, Aug. 21, 2017, pp. 197-210.

Sheikh, et al., "Image Information and Visual Quality", In Proceedings of International Conference on Acoustics, Speech, and Signal Processing, vol. 3, May 17, 2004, 4 Pages.

Shi, et al., "Real-time Single Image and Video Super-Resolution Using an Efficient Sub-Pixel Convolutional Neural Network", In Proceedings of the IEEE Conference on Computer Vision and Pattern Recognition, Jun. 27, 2016, 10 Pages.

Wang, et al., "Image Quality Assessment: from Error Visibility to Structural Similarity", In the Journal of IEEE transactions on image processing, vol. 13, Issue 4, Apr. 13, 2004, 14 Pages.

Yang, "Image Super-resolution via Sparse Representation", In the Journal of IEEE Transactions on Image Processing, May 18, 2010, 13 Pages.

Yang, et al., "Single-Image Super-Resolution: A Benchmark", In the Proceedings of European Conference on Computer Vision, 2014, 15 Pages.

Yeo, et al., "Neural Adaptive Content-Aware Internet Video Delivery", In the Proceedings of the 13th USENIX Symposium on Operating Systems Design and Implementation, Oct. 8, 2018, pp. 645-661.

* cited by examiner

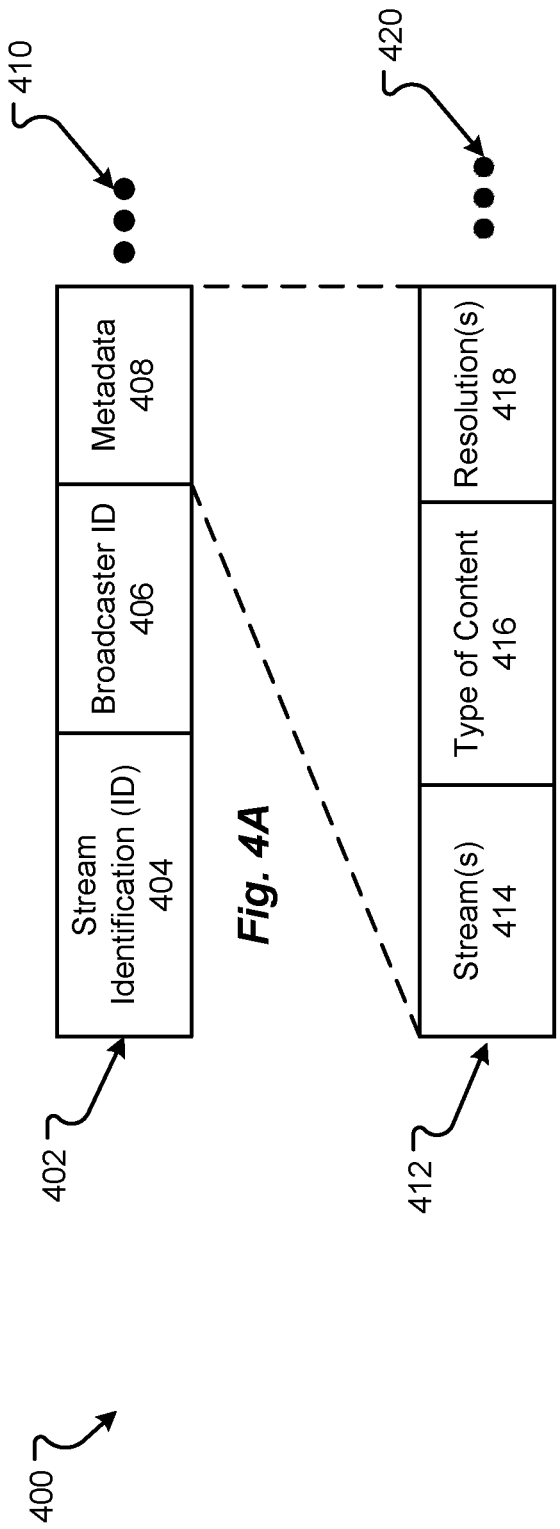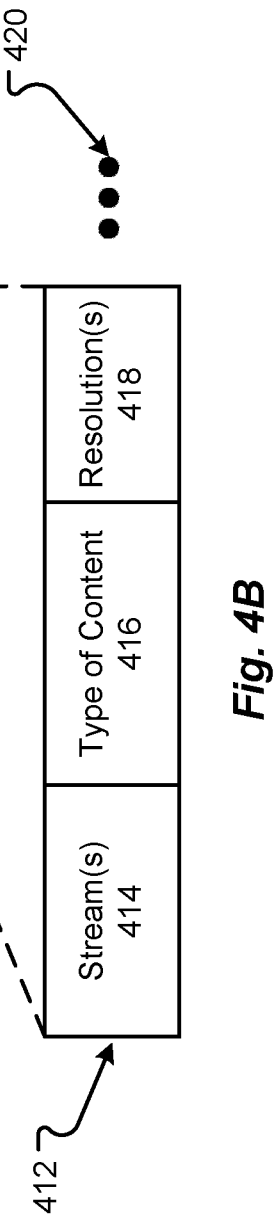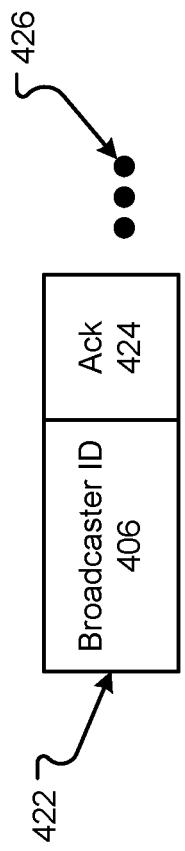

THIN-CLOUD SYSTEM FOR LIVE STREAMING CONTENT

BACKGROUND

Game streaming services are large and growing. Yet, despite the popularity of these services, the cost to livestream video remains high. Indeed, the costs for livestreaming multi-bitrate video on a cloud provider can be beyond the budget of many users. These costs are prohibitive for small companies looking to grow new services, and represent a large savings opportunity for cloud video providers.

One reason for such costs is the expense of performing, in real-time or near real-time, multi-bitrate transcoding in the cloud. Multi-bitrate services may accept video streams from a broadcaster at a single bitrate and then transcode the video at multiple bitrates so that viewers can adapt their stream quality to network conditions. When a viewer's network is strong, the viewer often streams high-quality video, and when a viewer's network is weaker, the viewer often transitions to a middle quality or a lower quality bitrate video. Generating multiple video qualities in real-time is computationally intensive and requires specialized hardware like graphics processing units (GPUs) or dedicated hardware transcoders to keep streaming at low latency.

SUMMARY

Configurations herein comprise a thin-cloud system for distributing content, for example, live streaming video content, from a broadcaster to a viewer. The computing devices of the broadcaster can provide the multi-bitrate transcoding. These multiple streams are received by a file server for provision to one or more viewers. The viewers can receive the streams at one of the two or more bitrates. If the viewer receives the content at a lower bitrate, the viewers can employ a machine learning (ML) co-processor that can operate as an accelerator to improve the inbound content, if that content is provided at a lower bitrate, and thus, a lower resolution. The file server can train and provide the ML models used for the acceleration.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 4A illustrates a data structure representing data or signals sent, retrieved, or stored by a virtual assistant in accordance with aspects of the present disclosure;

FIG. 4B is another data structure representing data or signals sent, retrieved, or stored by a virtual assistant in accordance with aspects of the present disclosure;

FIG. 4C is another data structure representing data or signals sent, retrieved, or stored by a virtual assistant in accordance with aspects of the present disclosure;

DETAILED DESCRIPTION

Aspects disclosed herein relate to a thin-cloud system for distributing content, for example, live streaming video content, from a broadcaster to a viewer. The viewer and/or broadcaster may be computing devices, for example, a mobile device, a game console, or computer. The "cloud" can be one or more servers that can provide commodity storage and content-distribution infrastructure, but may not provide more computation-intensive services or hardware, for example, resources like GPUs and other hardware accelerators. Rather, the computing devices of the broadcaster can provide the multi-bitrate transcoding. Further, the viewer can employ a machine learning (ML) co-processor that can operate as an accelerator to improve the inbound content, if that content is provided at a lower bitrate, and thus, a lower resolution.

Thus, the broadcaster and viewer includes hardware acceleration, which is deployed in two ways. First, the system employs the broadcasting devices' hardware video encoders to generate and upload videos at different resolutions. This shift of processing obviates the need to transcode in the cloud, but this transition could potentially limit the levels of quality that a receiving device can upload when battery or bandwidth resources are constrained at the broadcaster. To mitigate lapses in video quality, the viewers can be provided with a type of resolution upscaling (e.g., a hardware-accelerated super-resolution convolutional neural network (CNN)) to improve the visual quality of reduced-resolution video.

Figure 1:
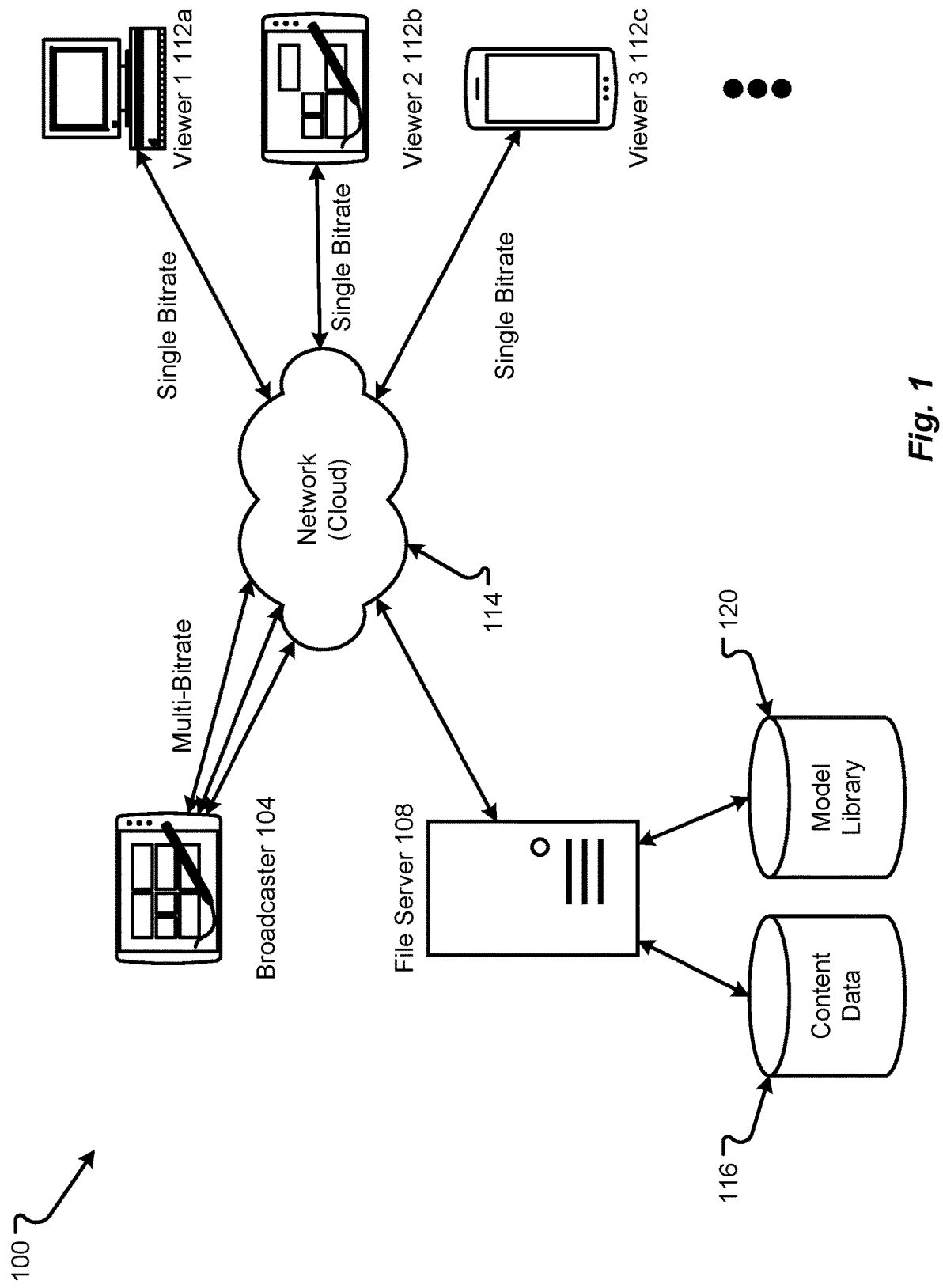
FIG. 1 illustrates a first system diagram in accordance with aspects of the present disclosure.

A system 100 for providing content, for example, live streaming video content, may be as shown in FIG. 1. A broadcaster 104 may be in communication with a file server 108 (for example, a cloud server), which may be in communication with one or more viewers 112. The broadcaster 104, file server 108, and/or viewer(s) 112 may each embody or execute on a computing system or device, as described hereinafter in conjunction with FIGS. 10-13. Hereinafter, the file server 108 may be used to represent all of the types of cloud computing systems or applications that provide a service to assist in the delivery of content to one or more viewers 112a, 112b, 112c, etc.

The broadcaster 104 can be any hardware, software, or combination of hardware and software associated with any computing device, mobile device, tablet, smart phone, desktop computer, laptop, or computer as described herein in conjunction with FIGS. 10-13. In at least some configurations, the broadcaster 104 is a mobile device connected to the cloud 114. An example of the broadcaster 104 or components forming an example configuration of the broadcaster may be as described in conjunction with FIG. 2A.

The file server 108 can include any hardware, software, or combination of hardware and software associated with the file server 108, as described herein in conjunction with FIGS. 10-13. It should be noted that the file server 108 and the broadcaster 104 may execute portions of an application to provide content to a viewer 112. Further, the file server 108 may be the portion of the content provider that is in communication with the viewer 112 and executes the interface to interact with the viewer 112, whether that viewer 112 is a mobile device or another type of computing system. An example of the file server 108 may be as described in conjunction with FIG. 2C.

The system 100 can also include one or more viewers 112 that may be in communication with the file server 108 (but not necessarily the broadcaster 104) over the network 114. However, in some configurations, the broadcaster 104 may communicate directly with, by sending at least a portion of the signals to, the viewer 112 without communicating through the file server 108. The viewer 112 can be any hardware, software, or combination of hardware and software associated with any computing device, mobile device, laptop, desktop computer, or other computing system, as described herein in conjunction with FIGS. 10-13. An example of the viewer 112 may be as described in conjunction with FIG. 2B.

The file server 108 may communicate with the broadcaster 104 and/or viewer 112 through a distributed network 114 (also referred to as the "cloud"). The term "file server 108" can imply that at least some portion of the functionality of the file server 108 is in communication with the broadcaster 104 and/or the viewer 112. The network 114 can be any type of local area network (LAN), wide area network (WAN), wireless LAN (WLAN), the Internet, etc. Communications between the file server 108, the viewer 112, and/or the broadcaster 104 can be conducted using any protocol or standard, for example, TCP/IP, JavaScript Object Notation (JSON), Real-Time Messaging Protocol (RTMP), Hyper Text Transfer Protocol (HTTP) Live Streaming (HLS), etc. Generally, commands or requests received for content are routed to the file server 108 for processing, and the broadcaster 104 generally does not directly communicate with other computing devices, e.g., the viewer 112, the over the network 114 besides the file server 108. The file server 108 may be in communication with, have access to, and/or include one or more databases or data stores, for example, the video data store 116 and/or the model library data store 120.

The data stores 116 and 120 can be data repository, information database, memory, cache, etc., that can store content provided to the file server 108 by the broadcaster 104 or ML models created by the file server 108. The data stores 116/120 can store the information in any format, structure, etc. on a memory or data storage device, as described in conjunction with FIGS. 10-13. Generally, the video data 116 includes the content, metadata, and/or other information about the content provided to the file server 108 and can include one or more of, but is not limited to, content (e.g., video, audio, etc.), metadata (e.g., type of content, bitrates provided or available, resolution(s) provided or available, broadcaster information, date when content is provided, time when content is provided, locations (e.g., Uniform Resource Locator(s) (URLs) where the various different bitrate content is stored, etc.), and/or other information that may be specific to the content provided by the broadcaster 104 or a system associated with the broadcaster 104.

The model library 120 can include information or machine learning models, associated with content provided to the file server 108, which may be provided to the viewer 112 to allow the viewer 112 to provide resolution upscaling (e.g., with a hardware-accelerated super-resolution CNN) to improve the visual quality of reduced-resolution video at the viewer 112. For example, the model library 120 can include one or more ML models generated on similar content to that provided to the viewer 112. The provided model from the model library 120 can allow the viewer 112 to compensate for lower resolution content, likely at lower bitrates, either provided due to limitations of the viewer's network or the broadcaster's network. Further, the model library 120 may store metadata or other information about the models. The metadata or other information can include one or more of, but is not limited to, the content associated with the model, the configuration of broadcaster system, the configuration of the application or software (e.g., game being played, character being played in game, level of game, version of software or game, etc.) associated with the content, etc.

The viewer 112 can retrieve or have provided the content and/or the models from one or more of the data stores 116, 120. Then, the viewer 112 can playback the content, possibly using the model to improve the quality of the content, to the user interface of the viewer device. The process for providing content may be as described in conjunction with FIGS.

5-9. Signals exchanged between the components 104, 108, and/or 112 may be as described in conjunction with FIG. 3. The data stored, retrieved, or exchanged between components 104, 108, and/or 112 may be as described in conjunction with FIGS. 4A-4I.

Figure 2A:
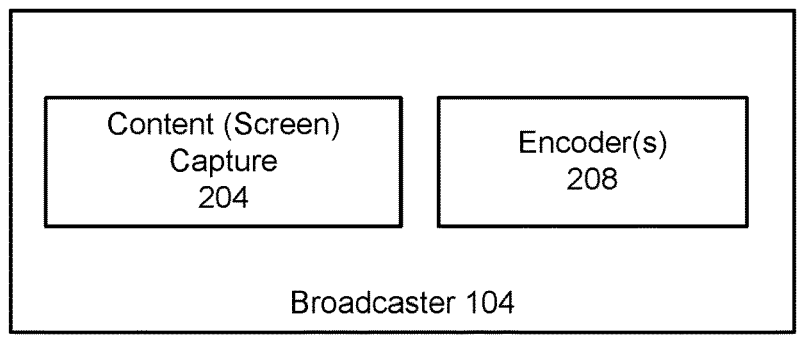
FIG. 2A illustrates a block diagram of a broadcaster in accordance with aspects of the present disclosure.

One or more components of the broadcaster 104 may be as shown in FIG. 2A. The broadcaster 104 can include one or more of, but is not limited to, a content (e.g., screen) capture component 204 and/or one or more encoders 208, for example video encoders. The content capture component 204 and encoders 208 can be any type of hardware and/or software executed or embodied in the broadcaster device 104. The contact capture component 204 can be a screen capture, audio capture, or some other hardware and/or software capable of recording or receiving content from a camera, microphone, etc. The contact capture component 204 can configure the saved content into a signal or data structure for provision to the file server 108. For example, the contact capture component 204 can provide an analog and/or a digital signal to the encoder(s) 208 to be further processed and to be sent over the network 114.

The encoder(s) 208 can any type of encoder capable of encoding the content signal from the contact capture component 204. Thus, the encoder(s) 208 can encode the content into a type of data structure, for example a Moving Picture Experts Group (MPEG) file, such as an MPEG-3 (MP3) or an MP4 file. The encoder(s) 208 may also be operable to send the signal, in some format or signal, to the file server 108. For example, the encoder(s) 208 can provide the signal to the file server in RTMP HLS or some other type of live-streaming protocol operable to communicate the signal to the file server 108.

Figure 2B:
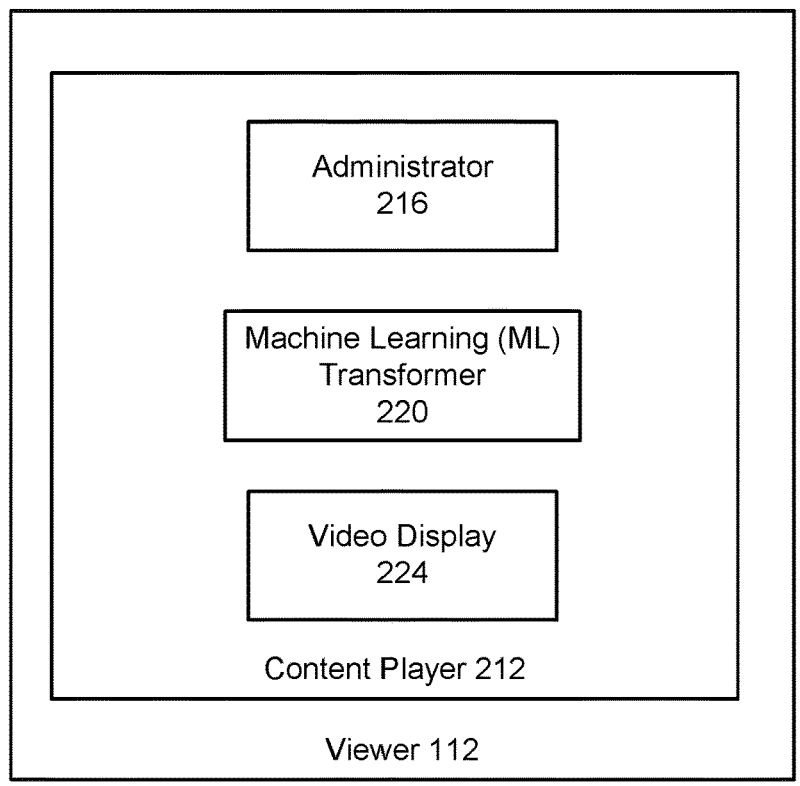
FIG. 2B illustrates a block diagram of a viewer in accordance with aspects of the present disclosure.

One or more components of the viewer 112 may be as shown in FIG. 2B. The viewer 112 can include a content player 212. The content player 212 can also include one or more of, but is not limited to, an administrator 216, a machine learning (ML) transformer 220, and/or a video display 224. The components 216, 220, 224, shown as being part of the content player 212, may be part of the viewer 112 or part of another component. The content player 212 can playback content from the broadcaster 104. As such, the content player 212 can play MP4 or other types of content files to a user interface, for example, a video display 224 or an audio interface.

The administrator 216 is operable to conduct information or signal exchanges between the viewer 112 and the file server 108. The administrator 216 can send or receive the signals as described in conjunction with FIG. 3. Further, the administrator 216 can provide the information needed for obtaining a ML model and/or content from the file server 108. Information received by the administrator 216 may be stored in memory, may be used by the ML transformer 220 and/or the video display 224 to provide content through the viewer 112, and or may be used for other purposes.

The machine learning (ML) transformer 220 is operable to obtain or retrieve a ML model from the file server 108. The ML transformer 220 may then change or accelerate the video or other content being provided to the viewer 112 into a higher resolution or better quality form of the content. In this way, the ML model can be applied to lower bitrate or lower resolution video or content and then be transformed into a higher resolution or higher bitrate content. The ML model applied may be applicable to a particular type of content, a type of encoding, other types of characteristics of the content, or combinations thereof. The ML transformer 220 may retrieve the ML model from the file server 108 based on metadata or other information provided by the administrator 216. Examples of upscaling technology used by the ML transformer 220 may be as described in U.S. Application Publication No. 2017/0339431, entitled "System and Method for Providing Real-Time Super-Resolution for Compressed Videos," filed Mar. 13, 2017, which is incorporated herein by reference for all that it teaches and for all purposes.

The video display 224 may be any hardware and/or software operable to provide content to the human user or viewer. Thus, the video display 224 can include any type of drivers or applications, for example, a video playback application in the viewer 112. The viewer 112 may receive content from the file server 108 and/or the broadcaster 104 and play the content back on the video display 224. Further, the content may be as modified by and received from the machine learning model transformer 220. The video display 224 can execute MP4 players to a display of a user interface for the user to view the content.

Figure 2C:
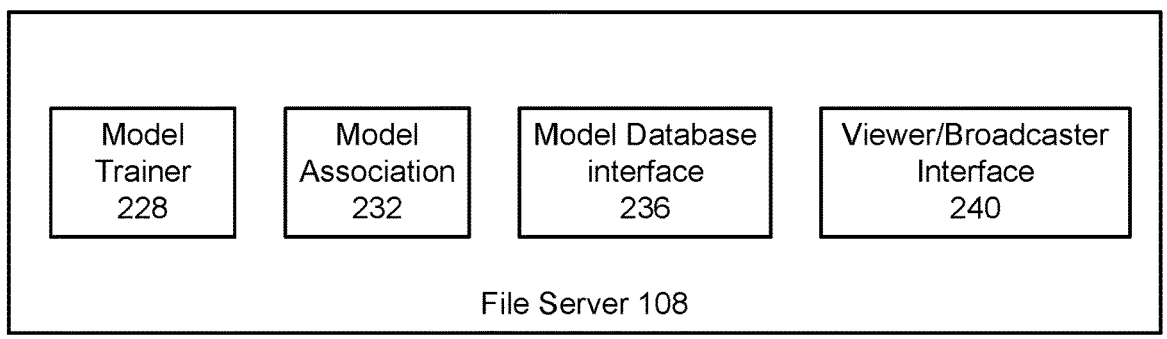
FIG. 2C illustrates a block diagram of a file server in accordance with aspects of the present disclosure.

An example configuration for a file server 108 may be as shown in conjunction with FIG. 2C. The file server 108 may include one or more of, but is not limited to, a model trainer 228, a model association component 232, a model database interface 236, and/or a viewer/broadcaster interface 240. Each of the components 222-240 can be executed in one or more computer systems. Thus, one component may be executed in a first computer system and another component may be executed on another computer system. The various components 222-240 can provide content from a broadcaster 104 through to a viewer 112. Each of the components 228 through 240 may be hardware, software, hardware and/or software.

A model trainer 228 can train a machine learning model of a convolution neural network (CNN). The model trainer 228 can receive the content from the broadcaster 104 and/or metadata associated with content. From the content and metadata, the model trainer 228 can create a ML model associated with the video, audio, or other type of content. The ML model may then be used to improve the video, audio, or other content when the content is delivered to the viewer 112 at lower bitrate, and thus, at a lower resolution. As such, the model trainer 228 can train models for various types of content, where those models are specific to content, the metadata, and/or the user needs. These generated models may be stored in the model library 120. In some configurations, the models may be used with hardware acceleration for a super-resolution CNN (SRCNN).

The model association component 232 may associate each model with the type of content in the content data 116. The determined association can be a link or pointer to the model and/or content, based on the content type or other information, in the model library 120. The model association may be based on metadata associated with the content being presented to the user. If a model has similar metadata to the content being streamed, then the model may also be associated with that content. The type of metadata that may be associated with the model can include one or more of, but is not limited to, the video or game being watched or streamed, the level or chapter of the video or game, the song being streamed, the singer, the character being played in the game, the actor, where the content is being filmed (for example, outdoors, indoors etc.), or other types of metadata. The source of the metadata may be any of one or more of, but is not limited to, the game, played by the broadcaster, may provide the metadata, the player may provide the metadata (e.g., telling their audience that they are playing a particular game with a particular character), or could be automatically inferred by performing ML-based object recognition on the stream at either the broadcaster 104 or viewer 112.

The model database interface 236 can store or retrieve models in the model library 120. The model database interface 236 can conduct or interface with any type of database, for example, flat file databases, file systems, hierarchical databases, nodal databases, relational databases, etc. To store or retrieve models, the model database interface 236 can receive information from the viewer/broadcaster interface 240 to retrieve a model from the model library 120 or to store a model to the model library 120. Thus, any information required to retrieve or store models, within the model database 120, may be provided to the model database interface 236. Further, the broadcaster 104 may provide the information for the model to be stored in the model library 120. Thus, the broadcaster 104 can create models for and store models into the model library 120.

The viewer/broadcaster interface 240 can include any interface or other hardware and/or software used to conduct communications to and from the broadcaster 104 and/or the one or more viewers 112. The viewer/broadcaster interface 240 can conduct communications in any format or over any type of communication infrastructure. The viewer/broadcaster interface 240 240 can also receive any information (for example, content, metadata, a request for content, models, playlists, etc.) received from the broadcaster 104 and/or viewer 112. This received information can be provided to the other components of the server 1084 based on any type of call or request.

Figure 3:
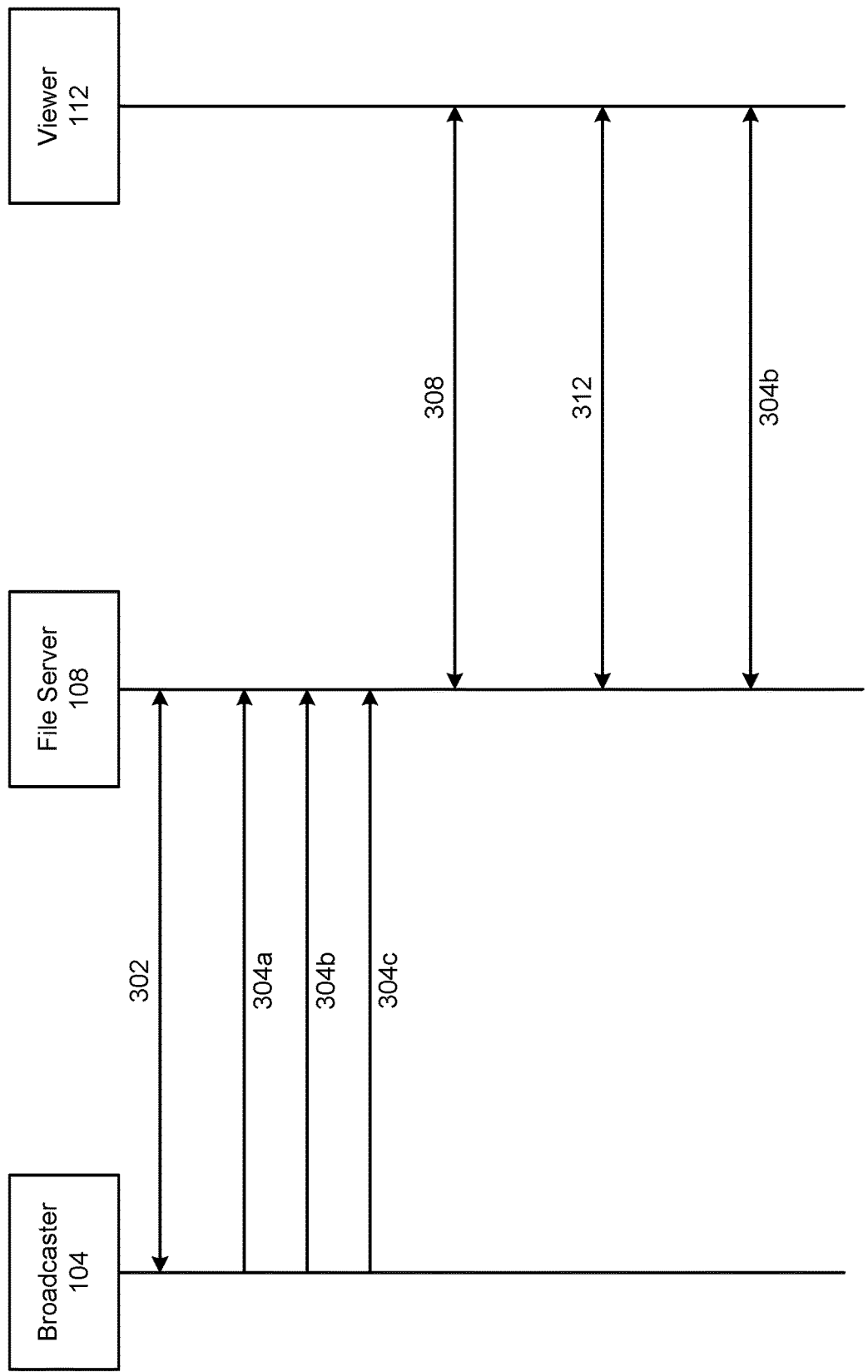
FIG. 3 illustrates a signaling diagram of signals sent between the broadcaster, file server, and/or viewer in accordance with aspects of the present disclosure.

A configuration of a signaling process of the processes provided herein may be as shown in FIG. 3. The one or more signals may contain data or other information, which may be as described in conjunction with FIGS. 4A-4I. As previously indicated, the communications shown in FIG. 3 may be conducted using any type of protocol and over any type of communication infrastructure.

A broadcaster 104 can initiate the sending of content, for example, live streaming video, by initiating contact with the file server 108, in signal(s) 302. The initial administrative signals 302 can include an indication to the file server 108 that the broadcaster 104 will be live streaming or providing content. An example of such a signal may be as described in conjunction with FIGS. 4A and 4B. The signal can include various information for the file server 108, for example, what streams may be provided by the broadcaster 104 (e.g., the bitrate of the content, the type of content, the resolution, etc.), how many streams of content will be sent, metadata about the content (for example, a type of video, the game being played, character being played in a game, level the game being played, etc.), etc. The file server 108 may acknowledge the provision of this administrative signal and information in an acknowledgment signal back to the broadcaster 104, included in signals 302. An example of the acknowledgment signal may include data structure 422 as is shown and described in conjunction FIG. 4C.

Thereafter, the broadcaster 104 may begin to provide one or more content signals or streams 304*a*, 304*b*, and/or 304*c*. An example of a content signal or the data within a content signal 304 may be as shown in data structure 428 as is described in conjunction with FIG. 4D. The content signals 304*a* through 304*c* may each be at a different resolution or bitrate. As such, the broadcaster 104 encodes and provides the various bitrates of streams for the file server 108, which may then store those different bitrate signals at different locations at the file server 108. In this way, the file server 108 need not perform any type of encoding for different signal bitrates because the broadcaster 104 has or is already providing different bitrate signals in signals 304*a* through 304*c*.

Contemporaneous with, before, or after signals 304 are received at the file server 108, a viewer 112 may also send administrative signals 308 to receive bitstreams from the file server 108. The signals 308 can be sent during the establishment of the connection between the viewer 112 and the file server 108 and may include two or more signals. For example, the viewer 112 may send a request for a playlist in a first signal 308. The file server 108 can receive the request and return a playlist to the viewer 112. The playlist can include a list of content available and being sent, having been sent, or going to be sent. The playlist may be provisioned from the file server 108 back to the viewer 112. The playlist can include various information as disclosed and described hereinafter in conjunction with FIG. 4F. The viewer 112 may then provide a file request containing one or more items of information from data structure 442 to identify which content stream the viewer 112 desires. The file request may be included in signal 308 or signal 312.

The content may be then provided to the viewer in signal 304*b*. Signal 304*b* can include the data structure 450 as is described in conjunction with FIG. 4G. Further, the playlist signal can include one or more model associations associated with the content. Thus, the viewer 112 may also request a model for the SRCNN. A request for a model may be similar to data structure 454 as described in conjunction with FIG. 4E. The file server 108 may provide the model in signal 312. The provision of the model may be in a signal including to data structure 458 as is described in conjunction FIG. 4F. In some configurations, the provision of a model may be automatic and the viewer 112 may not need to request the model because the model will be sent automatically in conjunction with the content stream 304*b*. Signal 304*b* is provided to the viewer 112 to indicate that the bitrate of stream 304*b* is appropriate for the viewer 112. Any one of the three signals 304*a*-304*c*, at the associated bitrate, could have been chosen by the viewer 112.

Configurations of data and data structures 400 that can be stored, retrieved, managed, etc. by the system 100 may be as shown in FIGS. 4A-4I. The data structures 400 may be part of any type of data store, database, file system, memory, etc. including object-oriented databases, flat file databases, file systems, etc. The data structures 400 may also be part of some other memory configuration. The databases, signals, etc. described herein can include more of fewer data structures 400 than those shown in FIGS. 4A-4I.

The data structure 402, shown in FIG. 4A, can represent the data in the administrative signal 302 sent by the broadcaster 104 to the file server 108. The data structure 402 can include one or more of, but is not limited to, a stream identification (ID) 404, a broadcaster ID 406, and/or metadata 408. There may be more or fewer data fields in data structure 402, as represented by ellipses 410. The stream ID 404 can include any type of information that can uniquely identify the stream of content from a broadcaster 104, received by the file server 108, and/or sent to a viewer 112. Thus, the stream ID can include an Internet Protocol (IP) address, an address or identifier of the broadcaster 104, a numeric ID, a uniform resource locator (URL), an alphanumeric ID, a globally unique ID (GUID), etc. There can be two or more stream IDs for the content if there are two or more streams of the same content sent by the broadcaster 104 at different bitrates or resolutions.

The broadcaster ID 406 can comprise an IP address, a broadcaster voiceprint, a broadcaster name, a broadcaster password, other biometric information, etc. The broadcaster ID information 406 may be provided by the broadcaster 104 or incorporated by the file server 108 into the data structure of FIG. 4A.

The metadata 408 can include information about the content in the stream. The metadata 408 can include descriptions or classifications of the content. The metadata 408 can be provided from various sources. For example, the metadata 408 may be provided by the game software that a broadcaster 104 is using, can be provided by the human broadcaster or player (e.g., telling the audience that they are playing a particular game w/a particular character), may be automatically inferred by performing machine-learning or another type of object recognition on the stream at either the broadcaster 104 or the viewer 112, or from other process or source.

An example of metadata 408 that may be provided in conjunction with data structure 402 may be as shown as in data structure 412. The data structure 412 may include one or more of, but is not limited to, one or more items of information 414 about the streams of content to be sent, the type of content in the streams 416, the resolutions or bitrates of the streams 418, etc. There may be more or fewer fields than that shown in data structure 412, as represented by ellipses 420. The stream information 414 can include information about the streams, such as an ID or other name, or information identifying the stream. The stream information 414 can also include the bitrate at which the stream will be sent.

The type of content 416 can include any type of identification of what type of media or content is being provided. Thus, the type of content 416 can include video, audio, multimedia presentations, etc. The type of content 416 can also include subtypes of different media. For example, if a video is to be sent, the type of content 416 can include what the video subject is, who the participants are in the video, the type of game being recorded, character's in the video, levels being played in the game, chapters being viewed, songs being played, artist being played, actors portraying characters, characters within the video or audio presentation, album names, etc. Thus, the type of content information 416 includes any information needed by the file server 108 to associate a model with the type of content about to be received. In this way, the file server 108 can recommend or send a model to the viewer 112 if the viewer 112 is unable to receive a higher resolution bit-stream.

The resolution information 418 can include the bitrate or resolution of the content being provided. For example, there may be one or more available bitrates of data being provided by the broadcaster 104. The resolution field 418 can identify the bitrate or resolution for each of those streams being provided by the broadcaster 104. Further, even if the bitrate is high, the resolution of the content may still be low. As such, the resolution field 418 can include the resolution of the content, for example, the video resolution, that may be associated with the content yet be disassociated with the bitrate being received. For example, the resolution can be can be 480P, 720P, 4K, 8K etc. A lower resolution 418 may be provided based on an available or capable bitrate for the broadcaster 104. Thus, at a lower bitrate, the resolution 418 provided may also be lower.

A configuration of a data structure 422, which may include the data that is sent from the file server 108 to the broadcaster 104 to acknowledge that one or more data streams of content are to be received and processed by the file server 108. The data structure 422 can include one or more of, but is not limited to, a broadcaster ID 406 and an acknowledgment 424. Data structure 422 can include more or fewer fields than that shown in FIG. 4C, as represented by ellipses 426. The data structure in FIG. 4C may include the broadcaster ID 406, which may be the same or similar to the broadcaster ID 406 in FIG. 4A and therefore will not be explained again. The acknowledgment 424 can include any type of signal or data provided from the file server 108 to the broadcaster 104 to acknowledge that the indication of content signals that will be sent has been received and that the file server 108 is ready to process such content streams 304.

Figure 4D:
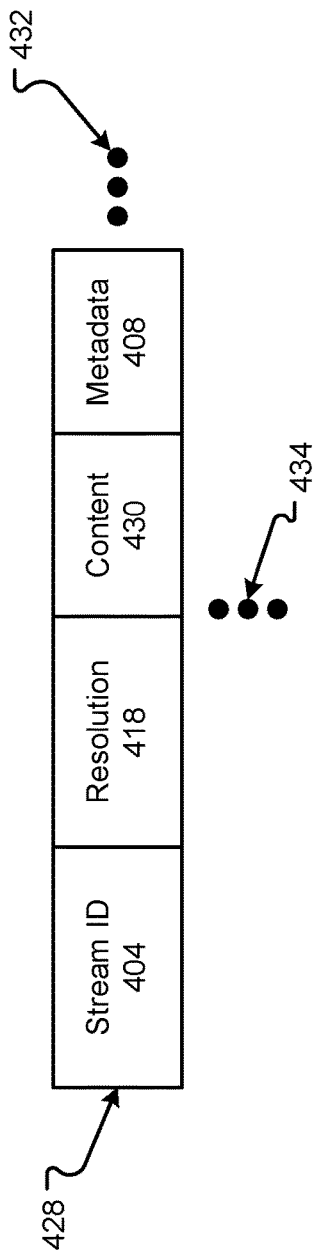
FIG. 4D is another data structure representing data or signals sent, retrieved, or stored by a virtual assistant in accordance with aspects of the present disclosure.

A configuration for a data structure 428, which can be provided by the broadcaster 104 to the file server 108 to send the content in signals 304, may be as shown in FIG. 4D. The data structure 428 can include one or more of, but is not limited to, the stream ID 404, a resolution indicator 418, the content 430, and/or metadata 408. There may be more or fewer fields in data structure 428, as represented by ellipses 432. Each of the different content streams can include a data structure 428 and thus there may be more data structures sent from the broadcaster 104 to the file server 108, as represented by ellipses 434. The data structure 428 in FIG. 4D may include the stream ID 404, resolution 418, and metadata 408, which may be the same or similar to those fields in FIG. 4A or 4B and therefore will not be explained again.

Content 430 can include any of the content to be delivered to the viewer from the file server 108. The broadcaster 104 may provide the content which can include, for example, video content, audio content, multimedia content, etc. Thus, the content 430 is the actual material being live streamed from the broadcaster 104.

Figure 4E:
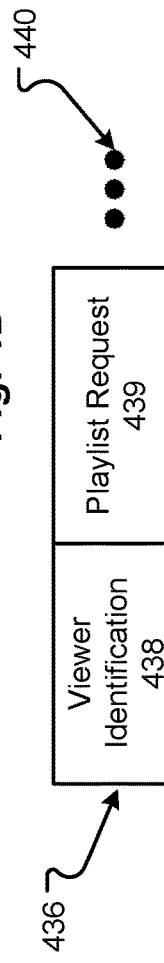
FIG. 4E is another data structure representing data or signals sent, retrieved, or stored by a virtual assistant in accordance with aspects of the present disclosure.

A data structure 436 that may be provided by the viewer 112 to the file server 108 to inquire about content in signal 308 may be as shown in FIG. 4E. The data structure 436 can include one or more of, but is not limited to, a viewer ID 438 and a playlist request 439. The data structure 436 can include more or fewer data fields than that shown in FIG. 4E as is represented by ellipses 440.

The viewer ID 438 can comprise an IP address, a viewer voiceprint, a viewer name, a viewer password, other biometric information, etc. The viewer ID 438 information may be provided by the viewer 112 or incorporated by the file server 108 into the data structure of FIG. 4E.

The playlist request 439 can include any type of inquiry from the viewer 112 to the file server 1082 to determine live streaming or other content that may be available for the viewer 112. The request 439 can include a redirection from a third-party application that is directed to an item of content. The request 439 can also be an inquiry into the list of content being provided or going to be provided and the schedule of when the content will be provided. Further, the request 439 can ask for other types of information, for example, when the content may be provided, the location from which the content can be retrieved, what type of content is to be provided, what machine learning model may be available, or other types of information.

Figure 4F:
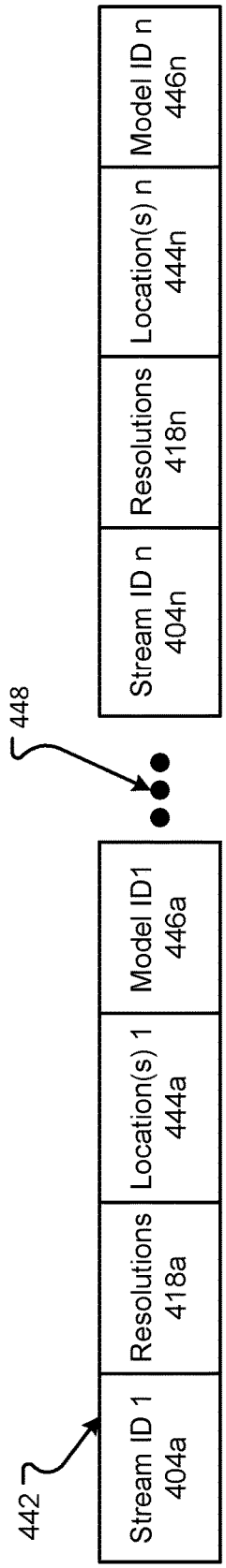
FIG. 4F is another data structure representing data or signals sent, retrieved, or stored by a virtual assistant in accordance with aspects of the present disclosure.

A configuration for a data structure 442, which may embody the playlist sent as a response to the playlist request 439, may be as shown in FIG. 4F. The data structure 442 can include one or more of, but is not limited to, a stream ID 404, one or more resolutions 418, one or more locations 444, one or more model IDs 446, etc. There may be a set of fields 404-446 for each stream in the playlist 442, as represented by ellipses 448. There may also be more or fewer fields than that shown in FIG. 4F, as also represented by ellipses 448. As shown, there may be a set of information for first stream 404a through 446a, a set of information for each subsequent stream, and a final set of information for an nth stream 404n through 446n. The stream ID 404 and resolution 418 may be the same or similar to those fields explained previously in conjunction with FIGS. 4A and 4B, and thus, will not be explained further here.

The location information 444 can include a location or link to the stream having the stream ID 404. For example, the location 444 can be a uniform resource locator (URL) indicating the location of the stream's saved location. Thus, for every type of content and associated bitrate, there may be a separate URL or location 444. These locations 444 can be provided to the user to select which content and which bitrate or resolution the user desires to receive. The viewer 112 can then retrieve that selected stream from the provided location 444.

The model identifier 446 can be any type of identifier, for example, a numeric identifier, and alphanumeric identifier, a GUID, etc., that uniquely identifies a machine learning model that may be used by the viewer 112 to process the content for a SRCNN. Each model may be associated specifically with that type of content and bitrate. The model ID 446 can be provided to the viewer 112 to request the model from the file server 108 as desired. In other configurations, the model ID 446 may also include the location to retrieve the model by the viewer 112 without having to request the model from the file server 108. A viewer may send a request to the file server 108 to receive the content which may include the stream ID 404. In other configurations, the viewer may link or navigate to the URL or location of the content, provided with the location information 444, to begin downloading or receiving the livestream.

Figure 4G:
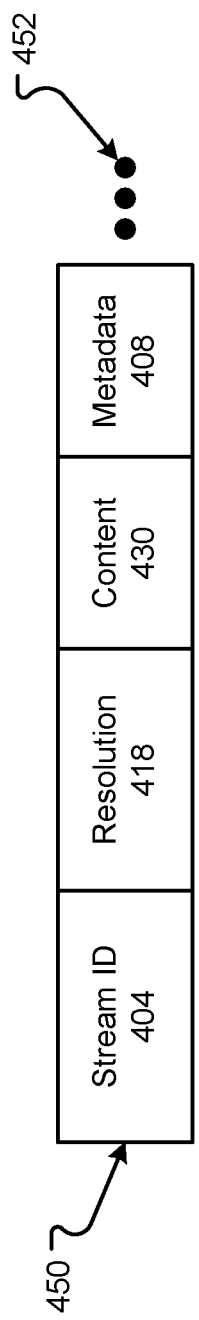
FIG. 4G is another data structure representing data or signals sent, retrieved, or stored by a virtual assistant in accordance with aspects of the present disclosure.
Figure 4H:
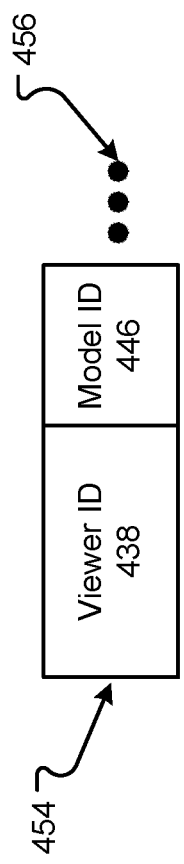
FIG. 4H is another data structure representing data or signals sent, retrieved, or stored by a virtual assistant in accordance with aspects of the present disclosure.
Figure 4I:
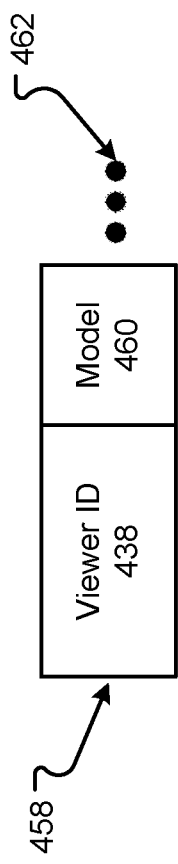
FIG. 4I is another data structure representing data or signals sent, retrieved, or stored by a virtual assistant in accordance with aspects of the present disclosure.

A configuration for a data structure 450, which may represent the provided livestream content from the file server 108, sent to the viewer 112, may be as shown in FIG. 4G. The data structure 450 can include one or more of, but is not limited to, a stream ID 404, resolution 418, content 430, and metadata 408. The packet 450 may be as provided in signal 304b as shown in FIG. 3. There may be more or fewer fields in the data packet 450, as represented by ellipses 452. Some of the data fields in the packet 450, for example, the stream ID 404, the resolution 418, the content 430, and the metadata 408, may be as explained previously in conjunction with FIGS. 4A through 4F. As such, these fields may not be explained further.

The viewer 112 may also request a model from the file server 108. A configuration for the request may include data structure 454, which may be as shown in FIG. 4E. The request can include one or more of, but is not limited to, the viewer ID 438 and/or a model ID 446. There may be more or fewer fields in data structure 454, as represented by ellipses 456. The fields in the request for the model, for example, the viewer ID 438 and the model ID 446 may be as previously described in conjunction with FIGS. 4A through 4F. Thus, these fields need not be explained further here.

A response to the model request 454 may be as shown in data structure 458, presented in FIG. 4F. The response data structure 458 may be sent, by the file server 108, back to the viewer 112 in response to the request 454. The response 458 can include one or more of, but is not limited to, a viewer ID 438 and a model 460. There may be more or fewer fields in the response 458, as represented by ellipses 462. The viewer ID 438 may be as previously described in conjunction with FIGS. 4A through 4E, and thus, may not need to be explained further here.

The model 460 can be the ML model or a location of the where the ML model 460 can be retrieved. Thus, the viewer 112 can receive the model 460 from the file server 108 to employ in a SRCNN for lower bitrate streams. The ML model 460 can include whatever information needed to run the artificial intelligence engine on the viewer 112. The model 460 may be as created by the model trainer 228 and then used by the machine learning transformer 220.

Figure 5:
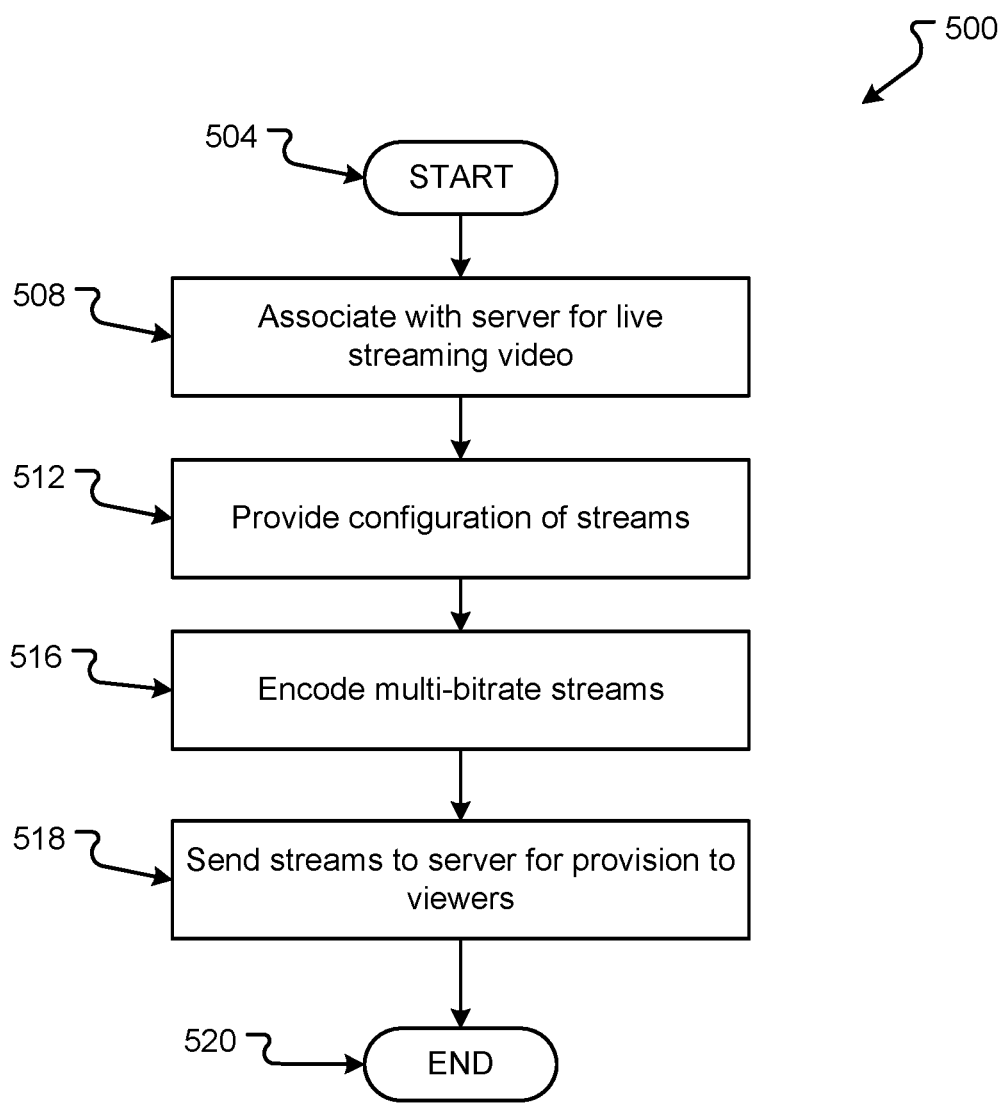
FIG. 5 illustrates a method, conducted by a broadcaster, for providing content in accordance with aspects of the present disclosure.

A method 500, as conducted by the broadcaster 104, for providing content to a file server 108 may be as shown in FIG. 5. A general order for the steps of the method 500 is shown in FIG. 5. Generally, the method 500 starts with a start operation 504 and ends with an end operation 520. The method 500 can include more or fewer steps or can arrange the order of the steps differently than those shown in FIG. 5. The method 500 can be executed as a set of computer-executable instructions executed by a computer system and encoded or stored on a computer readable medium. Further, the method 500 can be performed by gates or circuits associated with a processor, an application specific integrated circuit (ASIC), a field programmable gate array (FPGA), a system-on-chip (SOC), or other hardware device. Hereinafter, the method 500 shall be explained with reference to the systems, components, devices, modules, software, data structures, interfaces, methods, etc. described in conjunction with FIGS. 1-4I and 6-13.

A broadcaster 104 can associate with the file server 108 to provide livestreaming content (e.g., video) to the file server 108, in step 508. The broadcaster 104 can exchange signals 302, with the file server 108. The configuration and administration signals may be as described in conjunction with data structures 402, 412, and/or 422 of FIGS. 4A through 4C. The exchanged signal 302 can ensure that the broadcaster 104 is associated with the file server 108 for streaming content to the file server 108.

The broadcaster 104 may then provide configuration information of the streams to be sent to the file server 108, in step 512. For example, the broadcaster 104 can indicate, in data structure 402, including embedded metadata 412, which describes the streams 414, a type of content 416, the resolutions 418, and/or other metadata 408. This information allows the file server 108 to establish locations for storing the two or more streams of content sent at different bitrates, for provision to a viewer 112 at a later time. The broadcaster thus provides information required by the file server 108 to know the bitrates of the streams and how the streams will be encoded or sent to the file server 108. The file server 108 may then acknowledge the receipt of this content description by sending data structure 422 back to the broadcaster 104. Data structure 422 acknowledges reception of data packet 402 and that the file server 108 is ready to receive content.

Thereinafter, the broadcaster 104 may execute a content capture component 204 to capture content at the broadcaster 104. An encoder, for example, a video encoder 208, can encode the various bitstreams, at various bitrates or resolutions, and send the streams, as signal(s) 304a through 304c. Thus, the broadcaster 104 may send two or more bits streams, associated with the same content, to the file server 108. The content may be included in the data structure 428 sent in signal 304. The data structure 428 may include the content 430 and metadata 408 associated with the content 430 being live streamed from the broadcaster 104 to the file server 108. After encoding the signals, the encoder 208 or other component of the broadcaster 104 may then send the streams 304 from the broadcaster 104 to the file server 108, in step 518. The streams sent to the file server 108 may then be forwarded to the viewer 112. The streams may be sent over any type of data or communication infrastructure and by any type of protocol or format used to format the data structure 428 and the streams 304.

Figure 6:
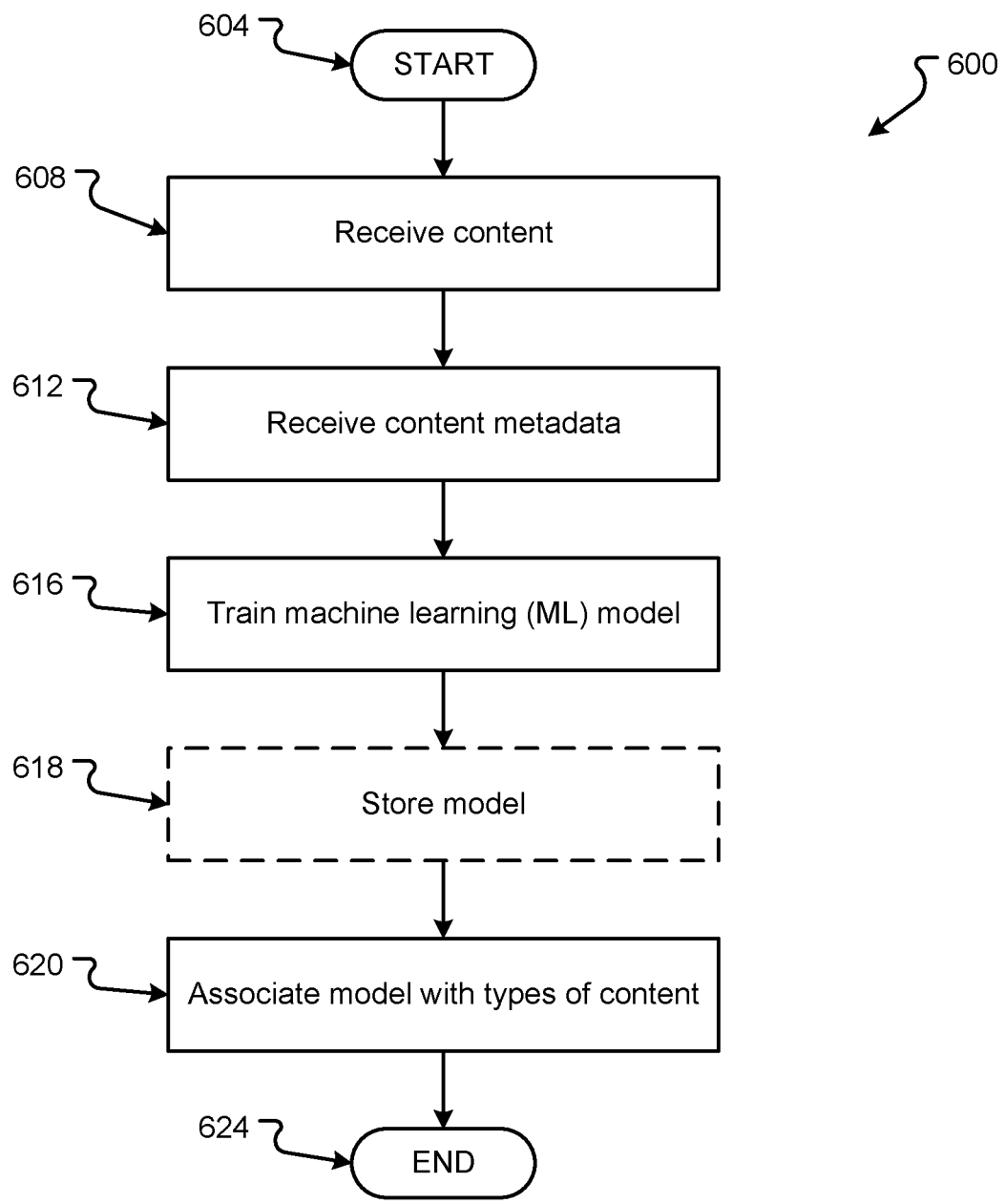
FIG. 6 illustrates a method, conducted by a file server, for training a machine learning model in accordance with aspects of the present disclosure.

A method 600, as conducted by the file server 108, for training an ML model for viewers 112 may be as shown in FIG. 6. A general order for the steps of the method 600 is shown in FIG. 6. Generally, the method 600 starts with a start operation 604 and ends with an end operation 624. The method 600 can include more or fewer steps or can arrange the order of the steps differently than those shown in FIG. 6. The method 600 can be executed as a set of computer-executable instructions executed by a computer system and encoded or stored on a computer readable medium. Further, the method 600 can be performed by gates or circuits associated with a processor, an ASIC, a FPGA, a SOC, or other hardware device. Hereinafter, the method 600 shall be explained with reference to the systems, components, devices, modules, software, data structures, interfaces, methods, etc. described in conjunction with FIGS. 1-5 and 7-13.

The file server 108 may receive content from a broadcaster 104, in step 608. After establishing a connection with the broadcaster 104, with the viewer/broadcaster interface 240, as explained in conjunction with FIG. 5, the file server 108 can receive the one or more streams of content 304 from the broadcaster 104. This content 430 may be stored in the content data store 116. Further, the viewer/broadcaster interface 240 can also receive metadata 408, in signals 302, 304, from the broadcaster 104 that is associated with the content 430 received by the broadcaster 104. This metadata may be received, in step 612, and also stored in content data store 116.

Thereinafter, a model trainer 228 may train the ML model using a convolutional neural network (CNN), in step 616. The model trainer 228 may evaluate content 430 and/or metadata 408 to determine characteristics of the content 430 to establish a machine learning model capable of conducting hardware acceleration for a SRCNN at a viewer 112. The model trainer 228 may view various types of similar content to train the machine learning model with each stream of content creating a more robust and effective model. The streams of the content are known to be similar based on the metadata 408. The model association component 232 may then associate the model with the various metadata such that future streams of content can be received, and a machine learning model identified for the viewer 112 of that new content.

The model association may be stored, with the model, by the model database interface 236 into the model library 120, in step 618. Storing the model may be optional as the model may be created in real-time for a user or supplied by the broadcaster 104. However, a more robust model can be trained on several different streams of content and is more likely to be stored in the model library 120. The model association component 232 may then associate the model with other types of content, in step 620. For example, when new content is received, the metadata 408 may be analyzed or compared to past metadata associated with the previously generated and stored models in the model library 120. If a similarity or match is determined in the metadata by the model association component 232, that machine learning model, in the model library 120, can also be associated with the new content, in step 620.

Figure 7:
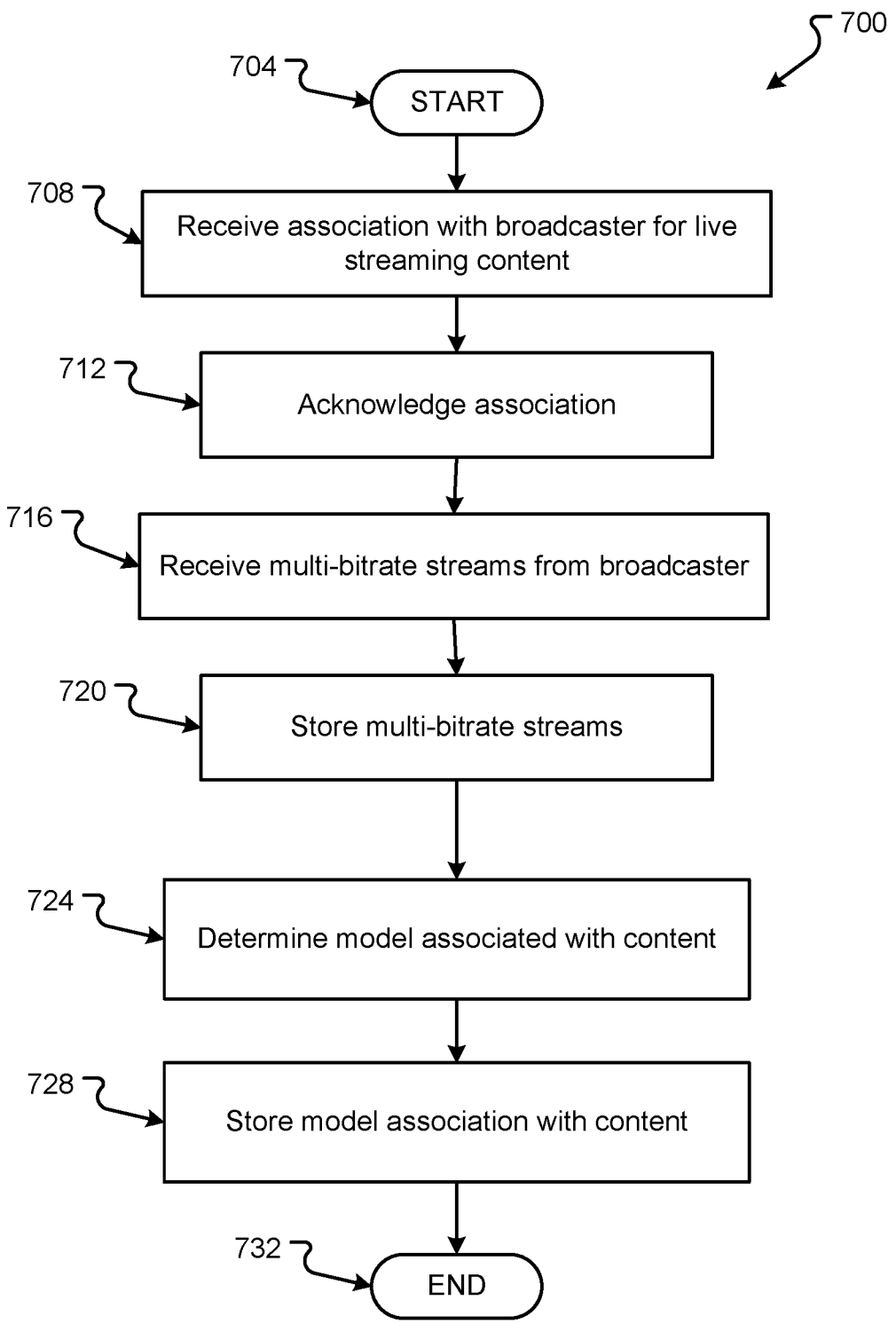
FIG. 7 illustrates a method, conducted by a file server, for receiving content from a broadcaster in accordance with aspects of the present disclosure.

A method 700, as conducted by the file server 108, for receiving content may be as shown in FIG. 7. A general order for the steps of the method 700 is shown in FIG. 7. Generally, the method 700 starts with a start operation 704 and ends with an end operation 732. The method 700 can include more or fewer steps or can arrange the order of the steps differently than those shown in FIG. 7. The method 700 can be executed as a set of computer-executable instructions executed by a computer system and encoded or stored on a computer readable medium. Further, the method 700 can be performed by gates or circuits associated with a processor, an ASIC, a FPGA, a SOC, or other hardware device. Hereinafter, the method 700 shall be explained with reference to the systems, components, devices, modules, software, data structures, interfaces, methods, etc. described in conjunction with FIGS. 1-6 and 8-13.

A viewer/broadcaster interface 240 can receive an association with the broadcaster 104 to receive live streaming content, in step 708. The set of administration signals 302 may be received by the file server 108 from the broadcaster 104. For example, data structures 402 and 412 may be received, in signals 302, from the broadcaster 104. The data structures 402 and 412 indicate that live streaming content will be sent by the broadcaster 104 to the file server 108 for provision to viewers 112. Upon receiving the data structures 402 and 412, in signals 302, the viewer/broadcaster interface 240, of the file server 108, may send data structure 422 as an acknowledgment of the association, in step 712. The acknowledgment 424 can indicate to the broadcaster 104 that the data packets 402 and 412 were received and that the viewer/broadcaster interface 240 is ready to receive the video or other content from the broadcaster 104.

The viewer/broadcaster interface 240 may then receive two more streams of content from the broadcaster 104, in step 716. The file server 108 can receive the two or more bitstreams 304, which may be associated with different bitrates from the broadcaster 104. The various streams may be included in data structure 450, as sent in signal 304. The viewer/broadcaster interface 240 can store these multiple bitrate streams on the content data store 116, in step 720. Further, the model association component 232 can review metadata 408, included in data structure 450 of the data streams 304. Based on metadata's similarity or likeness to metadata associated with one or more machine learning models, the model association component 230 can determine a model associated with the content, in step 724. This model association may be stored, for example, in a playlist 442, and stored either in the model library 120 or in the content data store 116 for provision to the viewer 112, in step 728.

Figure 8:
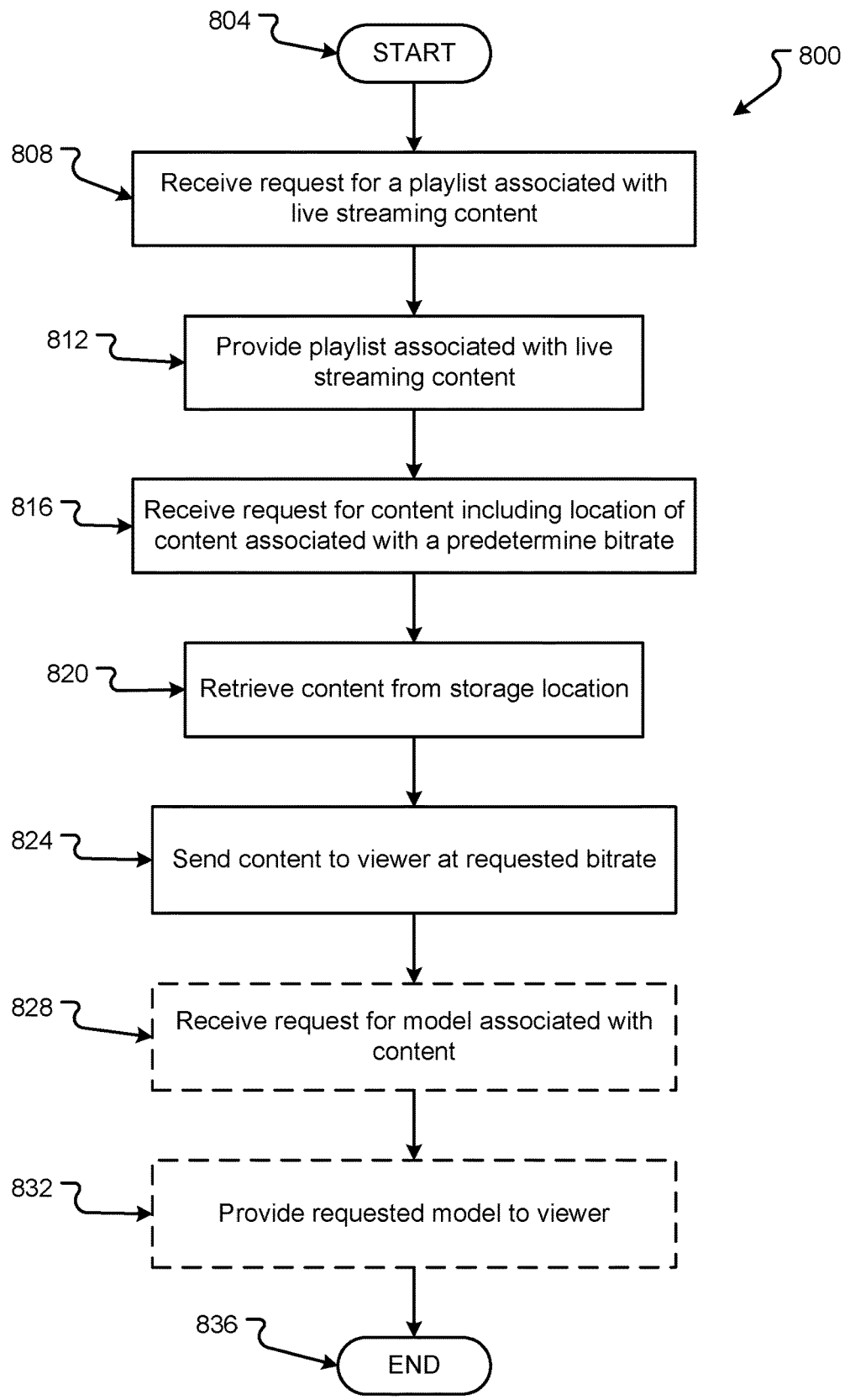
FIG. 8 illustrates a method, conducted by a file server, for providing content to a viewer in accordance with aspects of the present disclosure.

A method 800, as conducted by a file server 108, for providing content may be as shown in FIG. 8. A general order for the steps of the method 800 is shown in FIG. 8. Generally, the method 800 starts with a start operation 804 and ends with an end operation 836. The method 800 can include more or fewer steps or can arrange the order of the steps differently than those shown in FIG. 8. The method 800 can be executed as a set of computer-executable instructions executed by a computer system and encoded or stored on a computer readable medium. Further, the method 800 can be performed by gates or circuits associated with a processor, an ASIC, a FPGA, a SOC, or other hardware device. Hereinafter, the method 800 shall be explained with reference to the systems, components, devices, modules, software, data structures, viewer 112 interfaces, methods, etc. described in conjunction with FIGS. 1-7 and 9-13.

The viewer/broadcaster interface 240, of the file server 108, can receive an association with a viewer 112. Upon receiving an association with the viewer 112, the viewer/broadcaster interface 240 can receive a request for a playlist associated with live streaming content, in step 808. For example, the viewer 112 can send data structure 436, as a playlist request 439 in signal 308, to the viewer/broadcaster interface 240. In response to the request for a playlist, the viewer/broadcaster interface 240 can retrieve a playlist associated with content stored in the content data store 116 and provide that playlist to the viewer 112, in step 812. The playlist may be the same or similar to data structure 442, sent in signals 308 or 312, to provide a listing of and the types of content available for the viewer 112.

Thereinafter, the viewer/broadcaster interface 240 can receive a request for content, including a location 444 of that content, in data structure 442 send from the viewer 112 as signal 312, in step 816. The request may be a request to download or receive the content stream from a URL or other location 444. Based on the location 444 provided in the request sent by the viewer 112, the viewer/broadcaster interface 240 can retrieve the content from that storage location, in the content data store 116, in step 820. The retrieved data may then be sent to the viewer 112 at a requested bitrate, in step 824. The location 444 within the request may indicate which bitrate the user desires. For example, the viewer/broadcaster interface 240 may have stored content, which has a certain resolution and to be provided at a particular predetermined bitrate, in one location within the content data store 116 and, in contrast, stored content, which is at a different resolution and to be provided at a different bitrate, at a different location. Thus, knowing the location 444, the viewer 112 can request at which bitrate the viewer/broadcaster interface 240 is to send to the viewer 112.

Also within the playlist, the viewer/broadcaster interface 240 can provide a model ID 446 associated with the content having stream ID 404. Based on the identification of the model ID 446, the viewer/broadcaster interface 240 can receive a request for a model from the viewer 112, in step 828. The request may be submitted as data structure 454 shown in FIG. 4H. Thus, the viewer can identify themselves, with field 430, and request a model by model ID 446. The viewer/broadcaster interface 240 can request the model from the model database interface 236. Based on the provided model ID 446, the model database interface 236 can retrieve the requested model from the model library 120 can provide that model to the viewer/broadcaster interface 240. Then, the viewer/broadcaster interface 240 may insert the model in the data structure 458 and send or provide that requested model data structure 450 back to the viewer 112 as signal 312, in step 832.

Figure 9:
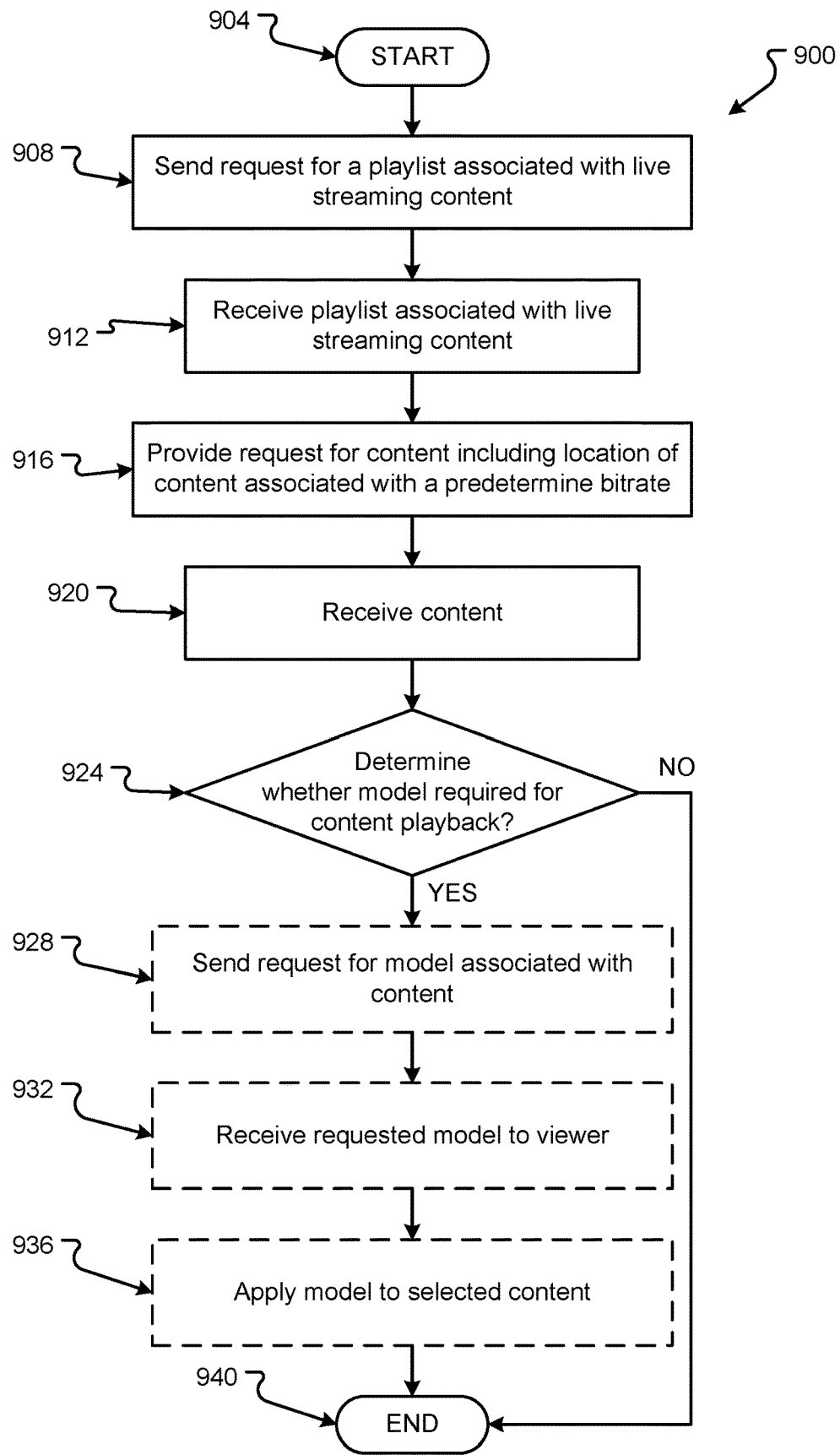
FIG. 9 illustrates a method, conducted by a viewer, for receiving content in accordance with aspects of the present disclosure.

A method 900, as conducted by a viewer 112, for receiving content may be as shown in FIG. 9. A general order for the steps of the method 900 is shown in FIG. 9. Generally, the method 900 starts with a start operation 904 and ends with an end operation 940. The method 900 can include more or fewer steps or can arrange the order of the steps differently than those shown in FIG. 9. The method 900 can be executed as a set of computer-executable instructions executed by a computer system and encoded or stored on a computer readable medium. Further, the method 900 can be performed by gates or circuits associated with a processor, an ASIC, a FPGA, a SOC, or other hardware device. Hereinafter, the method 900 shall be explained with reference to the systems, components, devices, modules, software, data structures, viewer 112 interfaces, methods, etc. described in conjunction with FIGS. 1-8 and 10-13.

The administrator 216, of the viewer 112, can request an association with a file server 108. Upon receiving an association with the file server 108, the administrator 216 can send a request for a playlist associated with live streaming content, in step 908. For example, the viewer 112 can send data structure 436, with a playlist request 439, to the viewer/broadcaster interface 240 of the file server 108, in signal 308. In response to the request for a playlist, the administrator 216, of the content player 212, can receive the playlist from the file server 108, in step 912. The playlist may be the same or similar to data structure 442, which provides a listing of types of content available for the viewer 112. The requested playlist may be sent as signal 308 and/or 312.

Thereinafter, the content player 212 can provide a request for content, including a location of that content from the location field 444 from data structure 442, to the file server 108, in step 916. The request may be a request to download the file or receive a bitstream from a URL or other location 444. The location 444 also indicates a desired bitrate for the content stream. Based on the location 444 provided in the request sent by the viewer 112, the viewer/broadcaster interface 240 can retrieve the content from that storage location in the content data store 116. The retrieved data may then be sent to and received by the content player 212, at the requested bitrate, in step 920.

The location 444 within the request may indicate which bitrate the content player 212 desires. The content player 212 may determine a best available download rate based on the communication environment and conditions perceived currently by the viewer 112. Thus, the content player 212 can choose a particular location 444 for a predetermined bitrate based on the desired resolution and bitrate desired. Thus, knowing the location 444, the viewer 112 can request which bitrate the viewer/broadcaster interface 240 is to send to the viewer 112.

The content player 212 can indicate to the machine learning transformer 220 the bitrate to be received. Based on whether the bitrate is highest resolution, the machine learning transformer 220 can determine whether a machine learning model is required for content playback, in step 924. If the video is being received at a lower bitrate, and thus a lower resolution, the machine learning transformer 220 can determine that a machine learning model may be needed to conduct hardware acceleration of the content in a SRCNN on the received content. If machine learning model is required, the method may proceed YES to step 928. However, if a machine learning model is not required for content playback the method 900 may proceed NO to end operation 940.

Also within the playlist, the viewer/broadcaster interface 240 can provide a model ID 446 associated with the content having stream ID 404. Based on the identification of the model ID 446, the machine learning model transformer 220 can send a request for a model to the file server 108, in step 928. The request may be submitted as data structure 454 shown in FIG. 4H and sent as signal 312. Thus, the viewer 112 can identify themselves, in field 430, and request a model by model ID 446.

The viewer/broadcaster interface 240 can provide the model associated with model ID 446 to the machine learning model transformer 220, in step 932. The model may be received by the machine learning transformer 220 in data structure 458. The machine learning transformer 220 may then apply the ML model to the content 430 in a SRCNN to conduct hardware acceleration. Thus, the machine learning model can increase the resolution of the received content 430 above the resolution received to provide a better playback to a video display 224 for the viewer 112. In this way, although the viewer 112 received content at a lower bitrate, the machine learning transformer 220 can transform the content to a higher resolution and to a better quality video for the video display 224. Thus, the viewer 112 provides a better user experience even when receiving lower bitrate or lower resolution content.

As an additional benefit, SRCNN reduces the costs for the file server 108. The file server 108 can send the lowest bitrate video and need not provide multiple bitrates. The SRCNN can then transform the lower bitrate video into a higher resolution. Thus, the file server 108 needs fewer resources to transmit the video, needs fewer resources to store the video, and the user still receives a high level of service. With the need for fewer resources, the cost to provide the video is reduced for the file server 108. In some configurations, the file server 108 may downscale the resolution of the content for storage. Then, the file server 108 may use the SRCNN model to upscale the stored content before sending the higher resolution content to the viewer 112.

Figure 10:
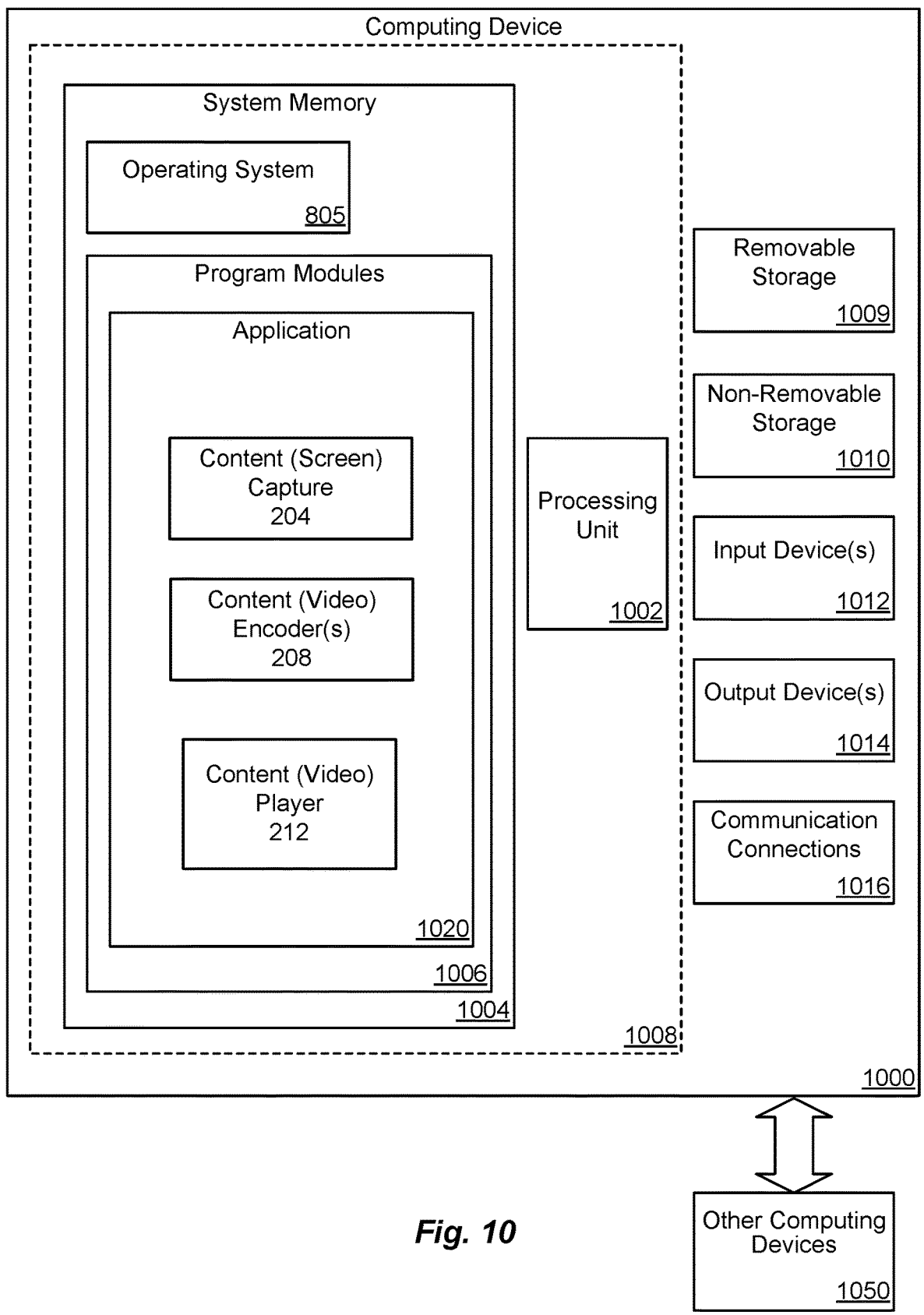
FIG. 10 is a block diagram illustrating example physical components of a computing device with which aspects of the disclosure may be practiced.

FIG. 10 is a block diagram illustrating physical components (e.g., hardware) of a computing device 1000 with which aspects of the disclosure may be practiced. The computing device components described below may be suitable for the computing devices described above. In a basic configuration, the computing device 1000 may include at least one processing unit 1002 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories. The system memory 1004 may include an operating system 805 and one or more program modules 1006 suitable for performing the various aspects disclosed herein. The operating system 805, for example, may be suitable for controlling the operation of the computing device 1000. Furthermore, aspects of the disclosure may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, a number of program modules and data files may be stored in the system memory 1004. While executing on the processing unit 1002, the program modules 1006 (e.g., application 1020) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various applications functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1000 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 1000 may also have one or more input device(s) 1012 such as a keyboard, a mouse, a pen, a sound or voice input device, a touch or swipe input device, etc. The output device(s) 1014 such as a display, speakers, a printer, etc. may also be included. The aforementioned devices are examples and others may be used. The computing device 1000 may include one or more communication connections 1016 allowing communications with other computing devices 1080. Examples of suitable communication connections 1016 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1004, the removable storage device 1009, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 11A:
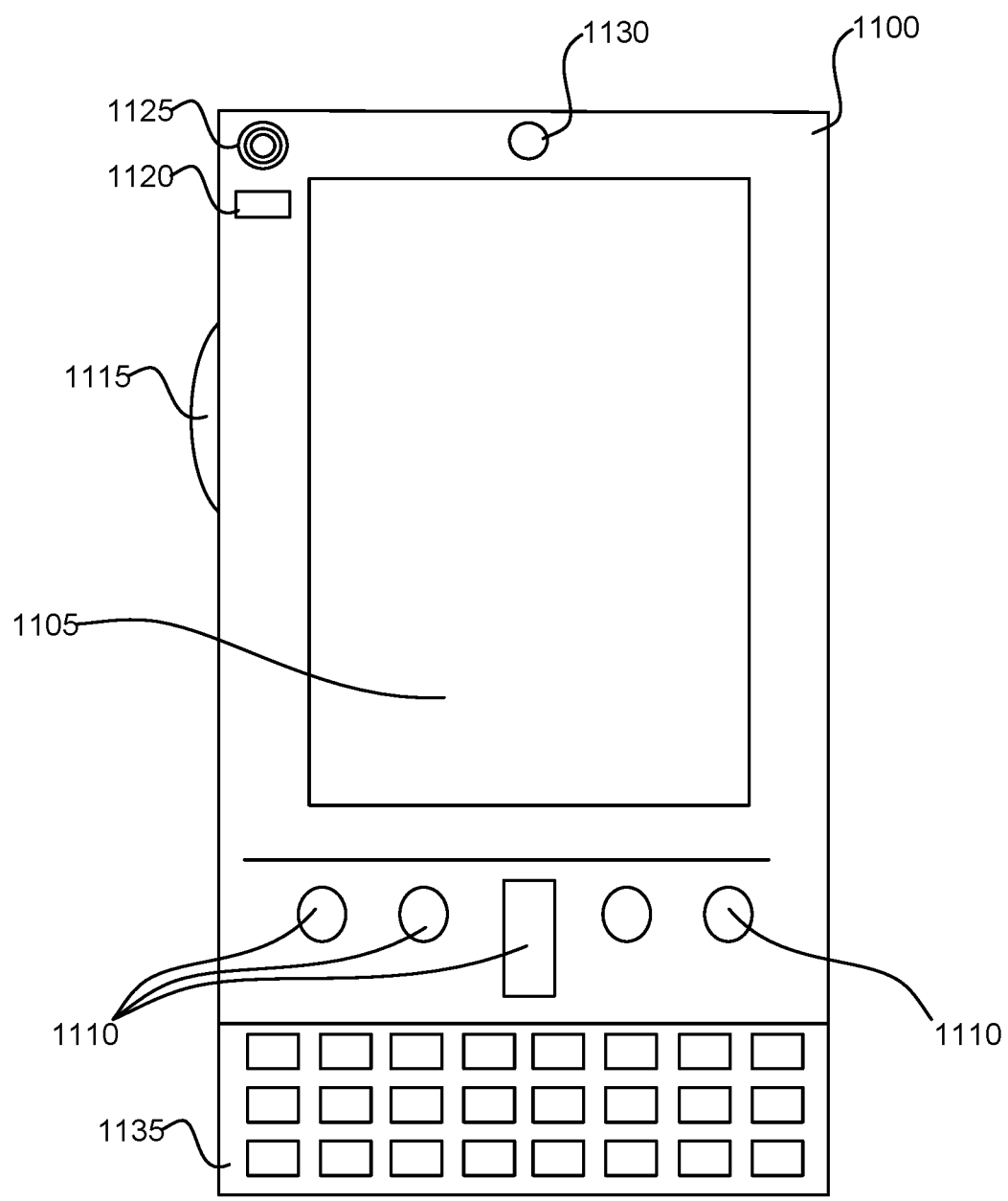
FIG. 11A is a simplified block diagram of a computing device with which aspects of the present disclosure may be practiced.
Figure 11B:
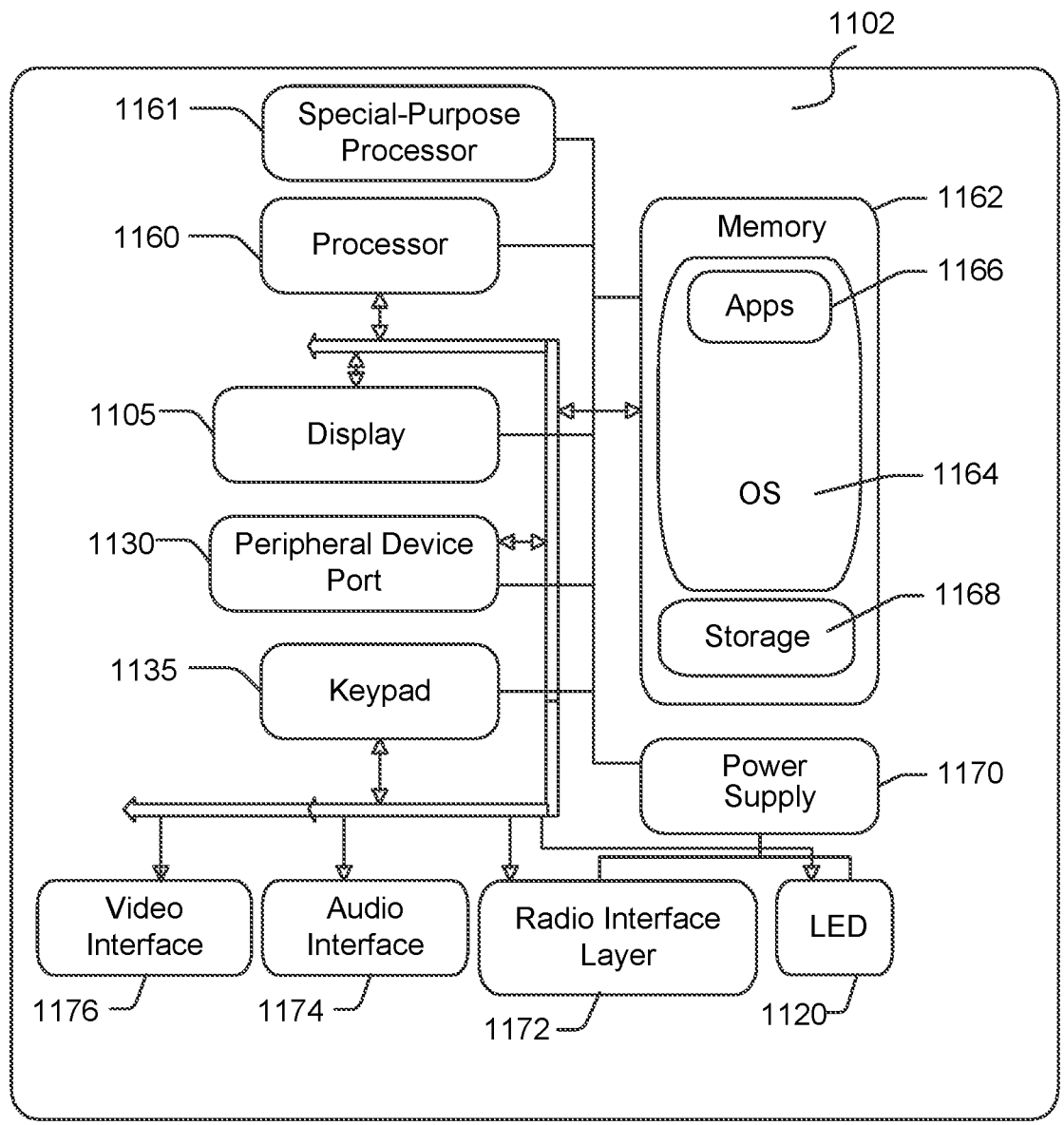
FIG. 11B is another are simplified block diagram of a mobile computing device with which aspects of the present disclosure may be practiced.

FIGS. 11A and 11B illustrate a computing device or mobile computing device 1100, for example, a mobile telephone, a smart phone, wearable computer (such as a smart watch), a tablet computer, a laptop computer, and the like, with which aspects of the disclosure may be practiced. In some aspects, the client (e.g., computing system 104, 112) may be a mobile computing device. With reference to FIG. 11A, one aspect of a mobile computing device 1100 for implementing the aspects is illustrated. In a basic configuration, the mobile computing device 1100 is a handheld computer having both input elements and output elements. The mobile computing device 1100 typically includes a display 1105 and one or more input buttons 1110 that allow the viewer 112 to enter information into the mobile computing device 1100. The display 1105 of the mobile computing device 1100 may also function as an input device (e.g., a touch screen display). If included, an optional side input element 1115 allows further viewer 112 input. The side input element 1115 may be a rotary switch, a button, or any other type of manual input element. In alternative aspects, mobile computing device 1100 may incorporate more or less input elements. For example, the display 1105 may not be a touch screen in some aspects. In yet another alternative aspect, the mobile computing device 1100 is a portable phone system, such as a cellular phone. The mobile computing device 1100 may also include an optional keypad 1135. Optional keypad 1135 may be a physical keypad or a "soft" keypad generated on the touch screen display. In various aspects, the output elements include the display 1105 for showing a graphical viewer 112 interface (GUI), a visual indicator 1120 (e.g., a light emitting diode), and/or an audio transducer 1125 (e.g., a speaker). In some aspects, the mobile computing device 1100 incorporates a vibration transducer for providing the viewer 112 with tactile feedback. In yet another aspect, the mobile computing device 1100 incorporates input and/or output ports, such as an audio input (e.g., a microphone jack), an audio output (e.g., a headphone jack), and a video output (e.g., a HDMI port) for sending signals to or receiving signals from an external device.

FIG. 11B is a block diagram illustrating the architecture of one aspect of computing device, a server (e.g., server 108), or a mobile computing device. That is, the computing device 1100 can incorporate a system (e.g., an architecture) 1102 to implement some aspects. The system 1102 can implemented as a "smart phone" capable of running one or more applications (e.g., browser, e-mail, calendaring, contact managers, messaging clients, games, and media clients/players). In some aspects, the system 1102 is integrated as a computing device, such as broadcaster, file server, viewer, and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and so forth. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as e-mail or other messages used by an e-mail application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100 described herein (e.g., search engine, extractor module, relevancy ranking module, answer scoring module, etc.).

The system 1102 has a power supply 1170, which may be implemented as one or more batteries. The power supply 1170 might further include an external power source, such as an alternating current (AC) adapter or a powered docking cradle that supplements or recharges the batteries.

The system 1102 may also include a radio interface layer 1172 that performs the function of transmitting and receiving radio frequency communications. The radio interface layer 1172 facilitates wireless connectivity between the system 1102 and the "outside world," via a communications carrier or service provider. Transmissions to and from the radio interface layer 1172 are conducted under control of the operating system 1164. In other words, communications received by the radio interface layer 1172 may be disseminated to the application programs 1166 via the operating system 1164, and vice versa.

The visual indicator 1120 may be used to provide visual notifications, and/or an audio interface 1174 may be used for producing audible notifications via the audio transducer 1125. In the illustrated configuration, the visual indicator 1120 is a light emitting diode (LED) and the audio transducer 1125 is a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the viewer 112 takes action to indicate the powered-on status of the device. The audio interface 1174 is used to provide audible signals to and receive audible signals from the viewer 112. For example, in addition to being coupled to the audio transducer 1125, the audio interface 1174 may also be coupled to a microphone to receive audible input, such as to facilitate a telephone conversation. In accordance with aspects of the present disclosure, the microphone may also serve as an audio sensor to facilitate control of notifications, as will be described below. The system 1102 may further include a video interface 1176 that enables an operation of an on-board camera 1130 to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 11B by the non-volatile storage area 1168.

Data/information generated or captured by the mobile computing device 1100 and stored via the system 1102 may be stored locally on the mobile computing device 1100, as described above, or the data may be stored on any number of storage media that may be accessed by the device via the radio interface layer 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio interface layer 1172 or via a distributed computing network. Similarly, such data/information may be readily transferred between computing devices for storage and use according to well-known data/information transfer and storage means, including electronic mail and collaborative data/information sharing systems.

Figure 12:
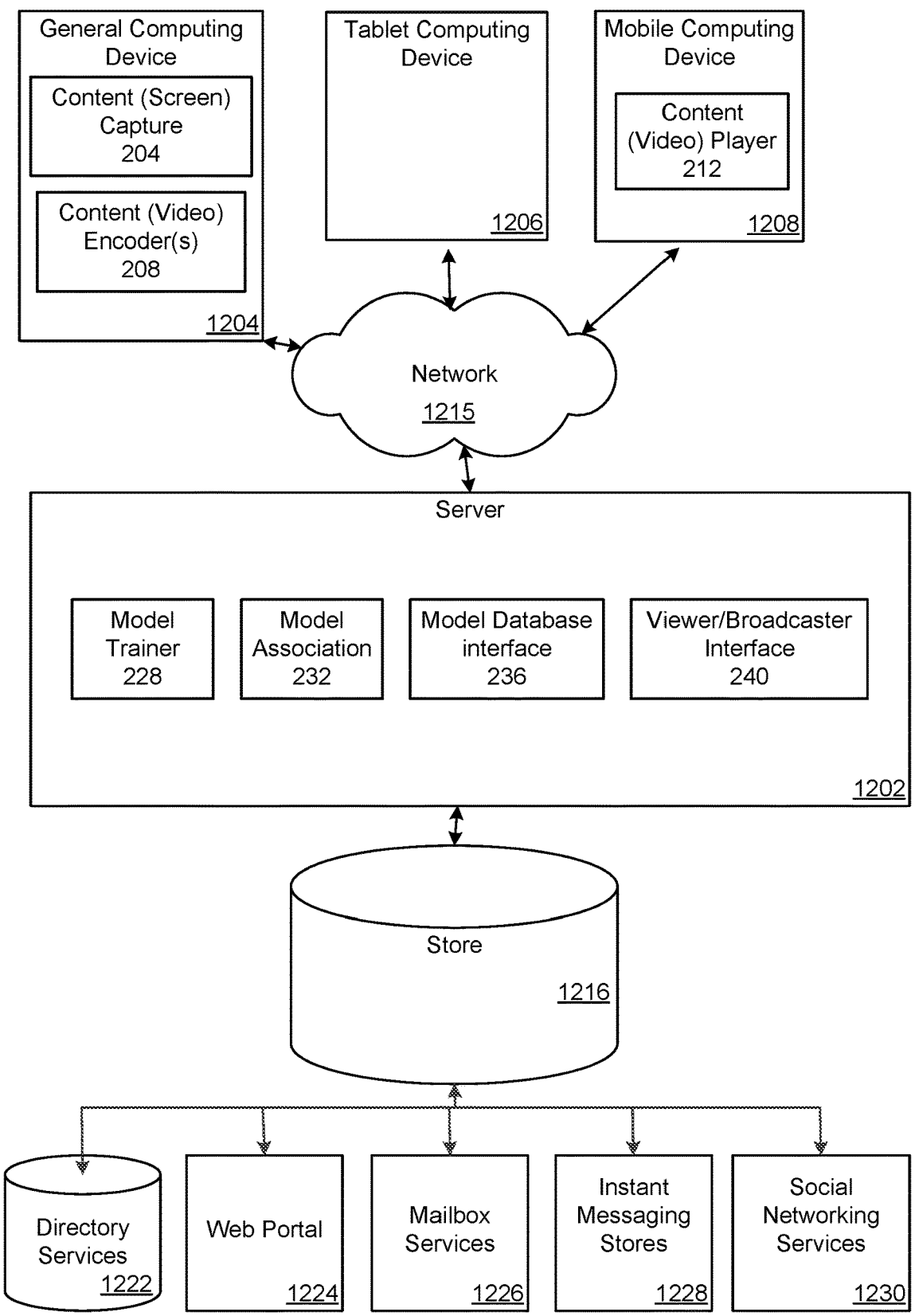
FIG. 12 is a simplified block diagram of a distributed computing system in which aspects of the present disclosure may be practiced.

FIG. 12 illustrates one aspect of the architecture of a system for processing data received at a computing system from a remote source, such as a personal computer 1204, tablet computing device 1206, or mobile computing device 1208, as described above. Content displayed at server device 1202 may be stored in different communication channels or other storage types. For example, various documents may be stored using a directory service 1222, a web portal 1224, a mailbox service 1226, an instant messaging store 1228, or a social networking site 1230. Unified profile application programming interface (API) 1221 may be employed by a client that communicates with server device 1202, and/or attribute inference processor 1220 may be employed by server device 1202. The server device 1202 may provide data to and from a client computing device such as a personal computer 1204, a tablet computing device 1206 and/or a mobile computing device 1208 (e.g., a smart phone) through a network 1215. By way of example, the computer system described above may be embodied in a personal computer 1204, a tablet computing device 1206 and/or a mobile computing device 1208 (e.g., a smart phone). Any of these configurations of the computing devices may obtain content from the store 1216, in addition to receiving graphical data useable to be either pre-processed at a graphic-originating system, or post-processed at a receiving computing system.

Figure 13:
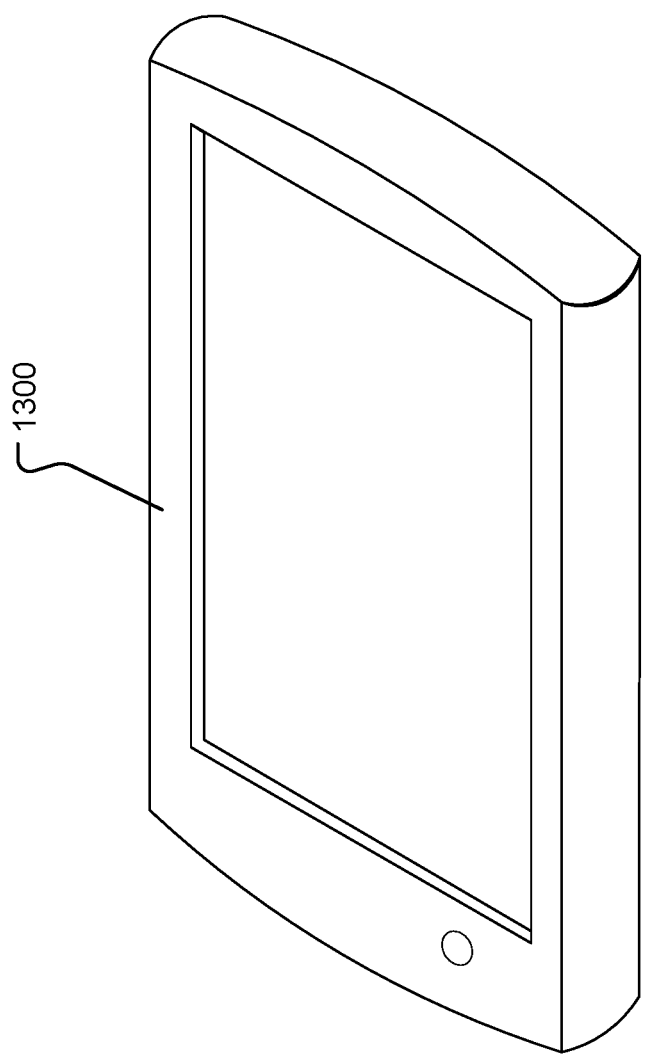
FIG. 13 illustrates a tablet computing device for executing one or more aspects of the present disclosure.

FIG. 13 illustrates an exemplary tablet computing device 1300 that may execute one or more aspects disclosed herein. In addition, the aspects and functionalities described herein may operate over distributed systems (e.g., distributed network-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which aspects of the disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

A number of variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an configuration with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Aspects of the present disclosure include a method comprising: receiving, at a file server, an association with a broadcaster; receiving information about a first and second stream of content to be streamed from the broadcaster to the file server; receiving the first stream of content at a first bitrate; receiving the second stream of content at a second bitrate; receiving a request from a viewer for the first stream of content; and transmitting the first stream of content to the viewer while maintaining the first stream of content at the first bitrate.

Any of the one or more above aspects, wherein the first and second stream of content is associated with a same content.

Any of the one or more above aspects, wherein the file server stores the first stream of content at a first location and stores the second stream of content at a second location.

Any of the one or more above aspects, wherein the first stream of content is at a first resolution and the second stream of content is at a second resolution.

Any of the one or more above aspects, wherein the same content is video.

Any of the one or more above aspects, wherein the file server generates a machine learning (ML) model from the same content.

Any of the one or more above aspects, wherein the file server receives a request for a playlist from the viewer.

Any of the one or more above aspects, wherein the file server provides the playlist, wherein the playlist includes the first location of the first stream and the second location of the second stream.

Any of the one or more above aspects, wherein the file server receives a request, from the viewer, for the same content from the first location, wherein the first stream is to be sent to the viewer at the first bitrate.

Any of the one or more above aspects, wherein the file server receives a request for the ML model to improve the first resolution of the first stream.

Any of the one or more above aspects, wherein the content in the first stream has a first resolution and the content in the second stream has a second resolution.

Any of the one or more above aspects, wherein the broadcaster provides metadata associated with the content to the file server.

Any of the one or more above aspects, wherein metadata comprises a stream identifier, a resolution, and/or a type of content.

Any of the one or more above aspects, wherein the broadcaster provides a machine learning model associated with the content.

Aspects of the present disclosure include a computer storage media having stored thereon computer-executable instructions that when executed by a processor cause the processor to perform a method, the method comprising: sending a playlist request, from a viewer and to a file server; in response to the request, receiving a playlist, wherein the playlist includes information about a first stream of a content and a second stream of the content that are available to be streamed from the file server to the broadcaster; sending a request to receive the first stream of the content; in response to the request to receive the first stream of the content, receiving the first stream of the content at the viewer; receiving information, in the playlist, associated with a machine learning (ML) model associated with the content; requesting the ML model from the file server; and applying the ML model to upscale the first stream of content.

Any of the one or more above aspects, wherein the playlist comprises information about a first bitrate for the first stream and a second bitrate for the second stream.

Any of the one or more above aspects, wherein the ML model is specific to the type of content.

Any of the one or more above aspects, wherein the ML model is applied in a super-resolution convolutional neural network to conduct hardware acceleration on the content to improve the resolution of the content.

Any one or more of the aspects as substantially disclosed herein.

Any one or more of the aspects as substantially disclosed herein optionally in combination with any one or more other aspects as substantially disclosed herein.

One or means adapted to perform any one or more of the above aspects as substantially disclosed herein.

What is claimed is:

1. A method comprising:
   receiving, at a file server, an association with a broadcaster;
   receiving information about a first and second stream of content to be streamed from the broadcaster to the file server;
   receiving the first stream of content, wherein the first stream includes encoded data at a first bitrate;
   receiving the second stream of content, wherein the second stream includes encoded data at a second bitrate, and wherein the second bitrate is distinct from the first bitrate;
   generating, based on the received first stream of content and the first bitrate, a first trained model for upscaling quality of the first stream of content;
   generating, based on the received second stream of content and the second bitrate, a second trained model for upscaling quality of the second stream of content, and wherein the second trained model is different from the first trained model;
   receiving a request from a receiver for the first stream of content at the first bitrate; and
   transmitting a combination of the first trained model and the first stream of content including the encoded data at the first bitrate to the receiver, wherein the first trained model enables the receiver to perform, as needed based on a network condition at the receiver, upscaling of quality to maintain the first stream of content at the first bitrate for viewing on the receiver.

2. The method of claim 1, wherein the first stream of content and second stream of content are associated with a same content.

3. The method of claim 2, wherein the file server stores the first stream of content at a first location and stores the second stream of content at a second location.

4. The method of claim 3, wherein the first stream of content is at a first resolution and the second stream of content is at a second resolution, wherein the first resolution is distinct from the second resolution.

5. The method of claim 2, wherein the same content is a video.

6. The method of claim 5, wherein the file server generates the machine learning (ML) model from the same content.

7. The method of claim 6, wherein the file server receives a request for a playlist from the receiver.

8. The method of claim 7, wherein the file server provides the playlist, wherein the playlist includes the first location of the first stream and the second location of the second stream.

9. The method of claim 3, wherein the file server receives a request, from the receiver, for the same content from the first location, wherein the first stream is to be sent to the receiver at the first bitrate.

10. The method of claim 6, wherein the file server receives a request for the ML model to improve the first resolution of the first stream.

11. A computer storage media having stored thereon computer-executable instructions that when executed by a processor cause the processor to perform operations, comprising:
    receiving, by a file server, an association with a broadcaster;
    receiving information about a first stream of a content and a second stream of the content for live streaming from the file server to a viewer;
    receiving the first stream of content, wherein the first stream includes encoded data at a first bitrate;
    receiving the second stream of content, wherein the second stream includes encoded data at a second bitrate, and wherein the second bitrate is distinct from the first bitrate;
    generating, based on the received first stream of content and the first bit rate, a first trained model for upscaling quality of the first stream of content;
    generating, based on the second stream of content and the second bit rate, a second trained model for upscaling quality of the second stream of content, wherein the second trained model is different from the first trained model;
    receiving a request from a receiver for the first stream of content at the first bitrate; and
    transmitting a combination of the first trained model and the first stream of content including the encoded data at the first bitrate to the receiver, wherein the first trained model enables the receiver to perform, as needed based on a network condition at the receiver, upscaling of quality to maintain the first stream of content at the first bitrate for viewing on the receiver.

12. The computer storage media of claim 11, wherein the content in the first stream has a first resolution and the content in the second stream has a second resolution, wherein the first resolution is distinct from the second resolution.

13. The computer storage media of claim 11, the operations further comprising:
receiving, by the file server, metadata associated with the content from the broadcaster.

14. The computer storage media of claim 13, wherein the metadata comprises a stream identifier, a resolution, and/or a type of content.

15. The computer storage media of claim 11, wherein the first trained model is based on a machine learning model associated with the content.

16. A computer storage media having stored thereon computer-executable instructions that when executed by a processor cause the processor to perform operations, comprising:
sending, by a receiver to a file server, a playlist request, wherein the file server includes a first stream of content for streaming encoded data at a first bitrate and a second stream of content for streaming encoded data at a second bitrate, wherein the second bitrate is distinct from the first bitrate;
in response to the request, receiving, by the receiver, a playlist, wherein the playlist includes information regarding:
the first stream of content and the second stream of content that are available to be streamed from the file server to the receiver, and
a machine learning (ML) model associated with the content, wherein the ML model comprises a first trained model for upscaling quality of the first stream of content at the first bitrate and a second trained model for upscaling quality of the second stream of content at the second bitrate;
sending, by the receiver, a request to receive the first stream of content for streaming encoded data at the first bitrate;
in response to the request to receive the first stream of content, receiving, by the receiver, a combination of the first stream of content including the encoded data at the first bitrate and the first trained model, wherein the first trained model enables upscaling quality as necessary based on a network condition at the receiver to maintain the first stream of content at the first bitrate; and
applying, based on the network condition at the receiver, the first trained model to upscale the first stream of content as necessary based on the network condition at the receiver.

17. The computer storage media of claim 16, wherein the playlist includes a first location for the first stream and a second location for the second stream.

18. The computer storage media of claim 16, wherein the playlist comprises information about the first bitrate for the first stream and the second bitrate for the second stream.

19. The computer storage media of claim 16, wherein the ML model is specific to a type of the content.

20. The computer storage media of claim 16, wherein the ML model is applied in a super-resolution convolutional neural network to conduct hardware acceleration on the content to improve the resolution of the content.

* * * * *